US012139391B2

United States Patent
Vaserman et al.

(10) Patent No.: US 12,139,391 B2
(45) Date of Patent: Nov. 12, 2024

(54) APPARATUS FOR FILLING INFLATABLE BABY FEEDING CONTAINERS

(71) Applicant: Elchanan Vaserman, Jerusalem (IL)

(72) Inventors: Elchanan Vaserman, Jerusalem (IL); Edan Kenig, Ramat Hasharon (IL)

( * ) Notice: Subject to any disclaimer, the term of this patent is extended or adjusted under 35 U.S.C. 154(b) by 433 days.

(21) Appl. No.: 17/441,231

(22) PCT Filed: May 20, 2020

(86) PCT No.: PCT/IL2020/050550
§ 371 (c)(1),
(2) Date: Sep. 20, 2021

(87) PCT Pub. No.: WO2020/188579
PCT Pub. Date: Sep. 24, 2020

(65) Prior Publication Data
US 2022/0162054 A1    May 26, 2022

(30) Foreign Application Priority Data
Mar. 20, 2019    (IL) .......................................... 265513

(51) Int. Cl.
*B67D 3/00*        (2006.01)
*A61J 9/00*        (2006.01)
(Continued)

(52) U.S. Cl.
CPC ............ *B67D 3/0067* (2013.01); *A61J 9/005* (2013.01); *A61J 9/0646* (2015.05); *A61J 9/0684* (2015.05);
(Continued)

(58) Field of Classification Search
CPC ..... B65D 83/0094; A61J 9/005; A61J 9/0646; A61J 9/0684; A61J 1/10
(Continued)

(56) References Cited

U.S. PATENT DOCUMENTS 4,690,307 A * 9/1987 Hogan .................... A23G 9/28
222/105
6,062,429 A    5/2000 West et al.
(Continued)

FOREIGN PATENT DOCUMENTS

JP    2016175676 A    10/2016
JP    2019511341 A    4/2019
(Continued)

OTHER PUBLICATIONS

European Patent Application No. 20773471.6, Partial European Patent Office Search Report, Nov. 25, 2022, 14 pages.
(Continued)

*Primary Examiner* — Timothy L Maust
(74) *Attorney, Agent, or Firm* — Rahman LLC

(57) ABSTRACT

A deflating device for transferring a liquid content from a supply container into a baby feeding device is disclosed, comprising a positioning and holding arrangement configured for positioning and for holding a dual structure comprising (i) a squeezable bag prefilled with a liquid content and constituting said supply container, and (ii) an inflatable container constituting said baby feeding device, the positioning and holding arrangement being configured to allow transferring the liquid content from the squeezable bag into the inflatable container while the dual structure is held by; the device is further comprising a deflating mechanism configured to apply a deflating pressure on the squeezable bag thereby evacuating its liquid content into the inflatable container. A method for finalizing a baby feeding formula and introducing it into a disposable inflatable container is also disclosed.

17 Claims, 8 Drawing Sheets

(51) Int. Cl.
  *A61J 9/06* (2006.01)
  *B65D 83/00* (2006.01)
  *B65D 85/80* (2006.01)

(52) U.S. Cl.
  CPC ......... *B65D 83/0094* (2013.01); *B65D 85/80* (2013.01); *B67D 3/0012* (2013.01); *B67D 3/0019* (2013.01)

(58) Field of Classification Search
  USPC ....... 222/61, 93–103, 209, 424.5; 383/38–40
  See application file for complete search history.

(56) References Cited

U.S. PATENT DOCUMENTS

| | | | |
|---|---|---|---|
| 6,364,165 B2 * | 4/2002 | Sampson | B65D 35/28 |
| | | | 222/102 |
| 7,156,132 B2 * | 1/2007 | O'Dougherty | B67D 7/0261 |
| | | | 141/286 |
| 9,089,647 B2 | 7/2015 | Haenggi et al. | |
| 9,687,107 B2 | 6/2017 | Austin et al. | |
| 2003/0024948 A1 | 2/2003 | Last | |
| 2004/0144799 A1 * | 7/2004 | Danby | B67D 1/0462 |
| | | | 222/103 |
| 2006/0182370 A1 | 8/2006 | Risgalla | |
| 2007/0262092 A1 | 11/2007 | Tyski | |
| 2011/0192865 A1 * | 8/2011 | Jung | B65D 83/62 |
| | | | 222/105 |
| 2012/0088022 A1 | 4/2012 | Carbone et al. | |
| 2013/0214000 A1 * | 8/2013 | Stratton | B67D 1/0462 |
| | | | 222/105 |
| 2015/0135964 A1 | 5/2015 | De Graaff et al. | |
| 2015/0251204 A1 * | 9/2015 | Kestner | A47G 19/183 |
| | | | 222/394 |
| 2016/0331644 A1 | 11/2016 | Vaserman | |

FOREIGN PATENT DOCUMENTS

| | | |
|---|---|---|
| WO | 2006129302 A | 12/2006 |
| WO | PCT/IL2020/050550 | 9/2020 |

OTHER PUBLICATIONS

Japanese Patent Application No. 2022-504749, Office Action, Jan. 30, 2024, 9 pages.

* cited by examiner

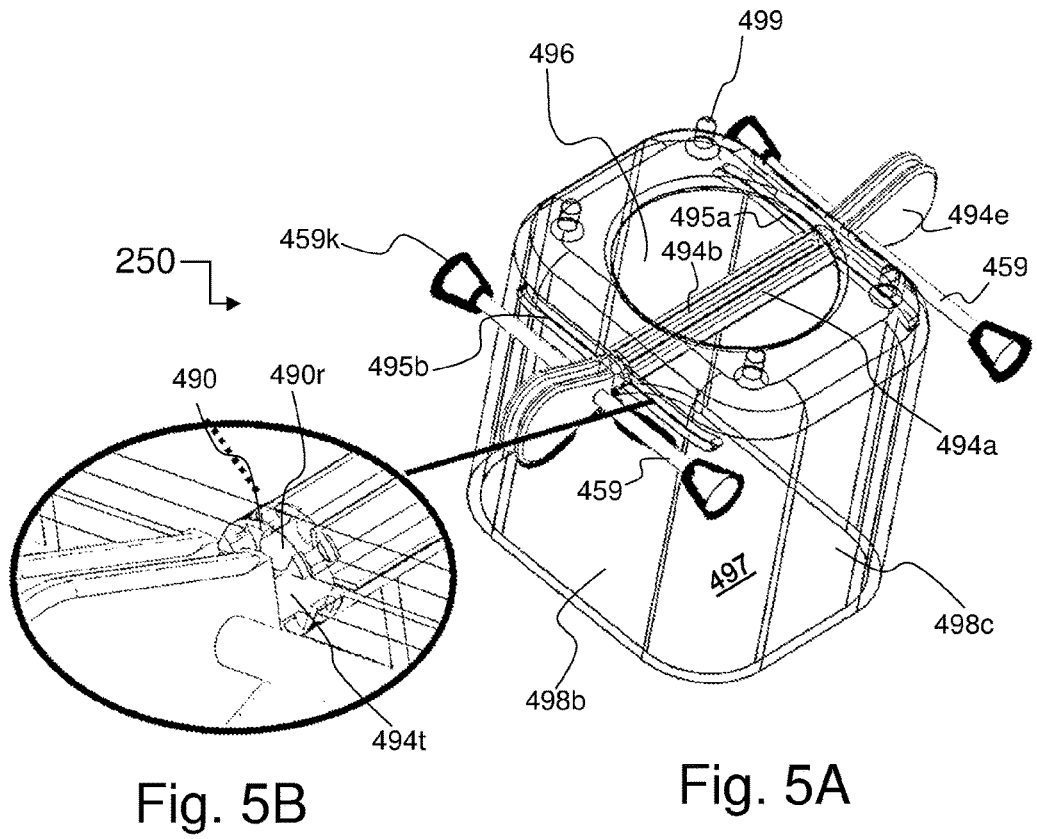
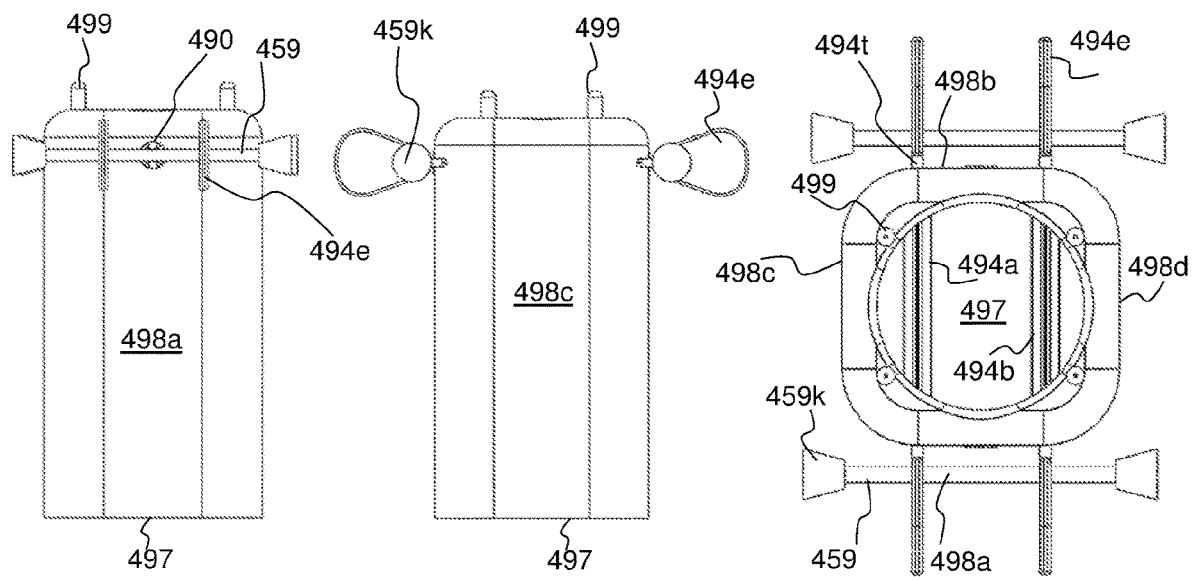
Fig. 5B Fig. 5A
Fig. 5C  Fig. 5D  Fig. 5E

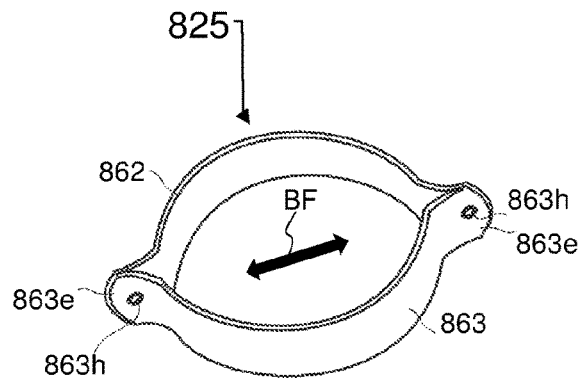
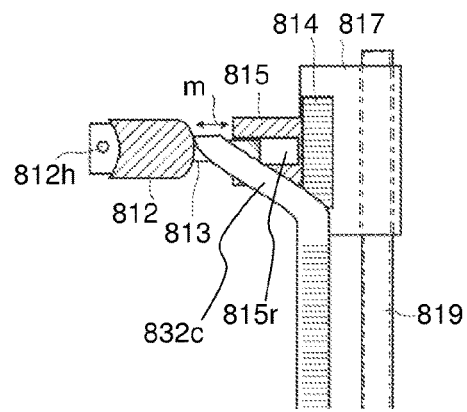
Fig. 5G    Fig. 5F
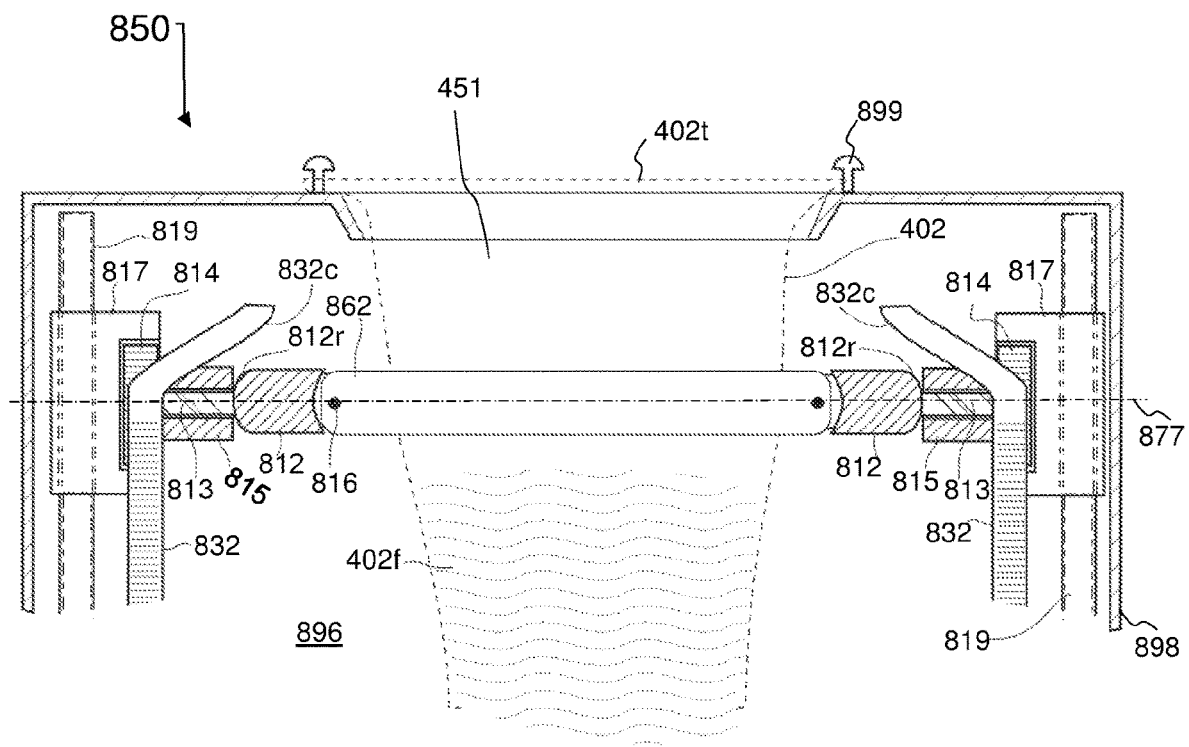
Fig. 5H

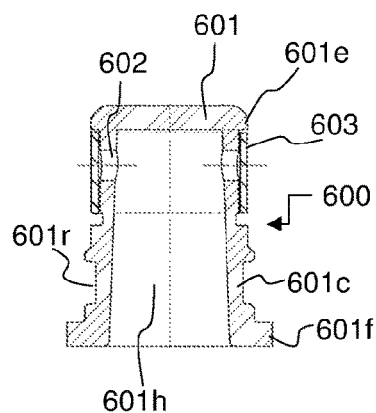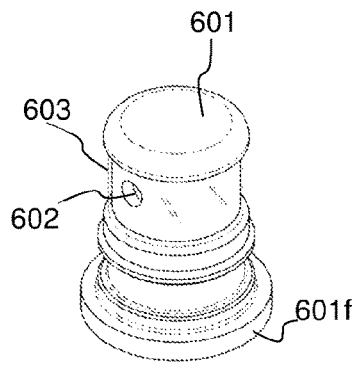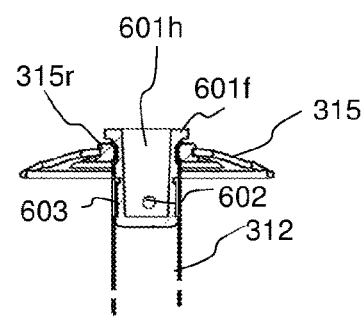
Fig. 6A  Fig. 6B  Fig. 6C
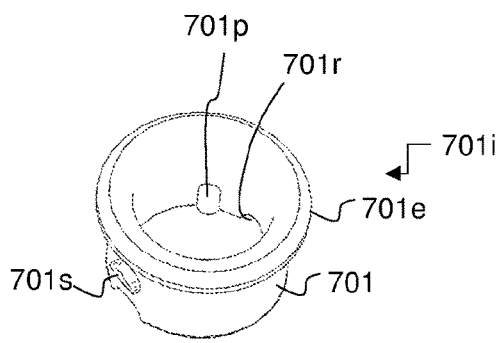
Fig. 7B
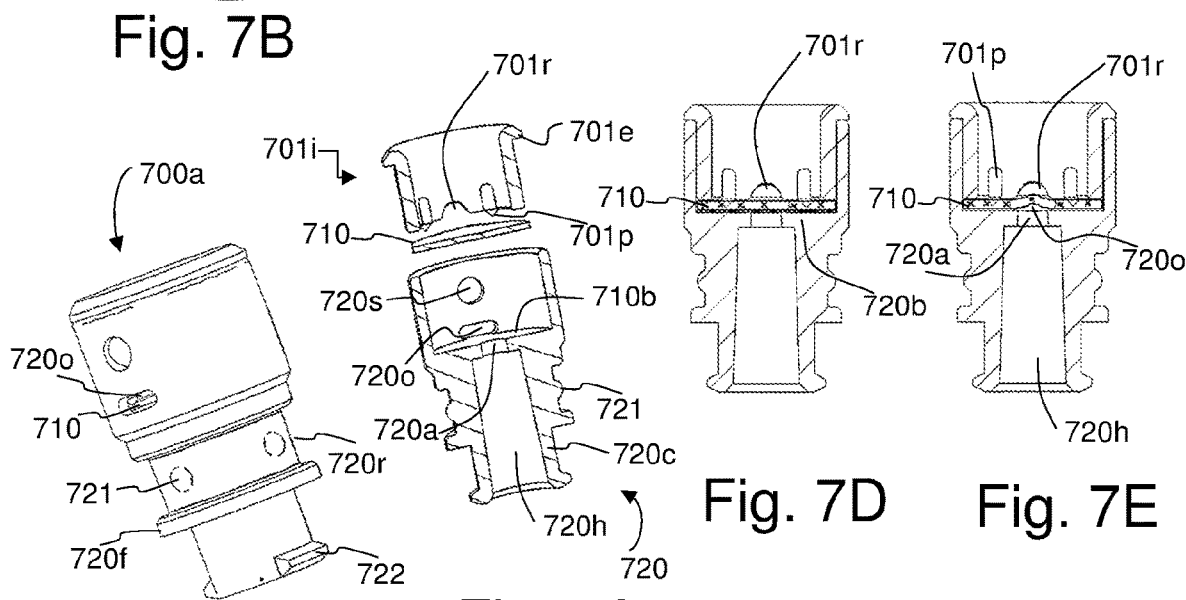
Fig. 7C  Fig. 7A  Fig. 7D  Fig. 7E

APPARATUS FOR FILLING INFLATABLE BABY FEEDING CONTAINERS

FIELD OF THE DISCLOSED SUBJECT MATTER

The disclosed subject matter relates to the field of apparatuses for filling baby feeding bottles with liquid food.

BACKGROUND OF THE DISCLOSED SUBJECT MATTER

Baby feeding bottles of most types and designs are reusable, and therefor require cleaning, at least as a means for preventing undesired development of pathogens. Their cleaning and sterility are under the responsibility of parents or of caregivers.

The inflatable containers related by WO2006129302 are disposable, and as such, may contribute to increase sterility in baby feeding, and to minimize contaminations resulting from faulty and/or recklessness user actions.

Final preparation of baby feeding formulas by mixing is normally made at home, however. Therefore, an inflatable container such as disclosed by WO2006129302 should allow a user to introduce the formula into the container in home conditions, in a facile manner and as close as possible to sterile. Method for improving sterility in finalization and filling of baby feeding formulas into disposable inflatable containers in home conditions by unskilled persons is thus required, and is among the objects of the presently disclosed subject matter.

Facilitating for the user the finalization process of a baby feeding formula as well as its filling process into an inflatable container is also among the objects of the presently disclosed subject matter.

SUMMARY OF THE DISCLOSED SUBJECT MATTER

Various embodiments of a deflating device for transferring a liquid content from a squeezable supply container into a baby feeding device are disclosed under a first category of disclosed solutions. In some of the embodiments, the devices are electrically powered and configured to allow for hands free transferring of the liquid content. In other embodiments of the disclosed subject matter, the liquid transferring process is manually driven. The deflating device comprises a mechanical arrangement for holding a dual structure comprising (i) a squeezable bag prefilled with a liquid content and constituting said supply container, being a first part of the dual structure; and (ii) an inflatable container constituting said baby feeding device, being a second part of the dual structure; the deflating device further comprises a manually or electrically operated deflating mechanism configured for deflating the squeezable bag thereby evacuating its liquid content into the inflatable container. The device according to the disclosed subject matter is referred to as a 'deflating device' based on the fact the supply container becomes deflated during the liquid transferring process. As can be appreciated, one can opt to refer to the same device as an 'inflating device', based on the fact the inflatable container of the baby feeding device becomes inflated during the liquid transferring process, simultaneously and as a result of the deflating of the supply container.

According to various embodiments of the presently disclosed subject matter, the deflating device is further comprising suspension arrangement for holding the dual structure with a longitudinal axis thereof in vertical orientation, in which the squeezable bag is up and the inflatable container is down.

According to various embodiments of the presently disclosed subject matter, the suspension arrangement is arranged about a space in which the dual structure is to be suspended, between upright walls which at least partially surround said space, and the suspension arrangement comprises at least two catching means, such as pegs. In various other embodiments of the disclosed subject matter the catching means may include hooks, spring-biased clamps, outwardly-bent wall edges, or the like. In some embodiments, the catching means, e.g. pegs, are spaced apart horizontally, and are oriented to protrude into the space, near a top end thereof. In other embodiments, the catching means, e.g. pegs, are spaced apart horizontally, and are oriented to protrude uprightly, from a top end of the surrounding walls and/or from the top end of a body of the device.

According to various embodiments the device is electrically operated, and further comprises a housing and a doored space inside the housing adapted for receiving and holding the dual structure isolated from the exterior environment.

In various embodiments the doored space comprises, in a midportion thereof, a clamping arrangement adapted to grip hold the dual structure in a connection region between the squeezable bag and the baby feeding device.

In various embodiments the clamping arrangement comprises a first semicircular element protruding from a back wall of the doored space, and a second semicircular element protruding from a door of the doored space and facing the first.

In various embodiments the electrical deflating device comprises an air pump for inflating the inflatable baby feeding device by providing it with a negative external pressure with respect to a pressure in which the squeezable bag is situated, thereby deflating the squeezable bag under pressure differentiation between the environment in which the squeezable bag is situated and the environment in which the baby feeding device is situated.

In various embodiments, the electrical deflating device comprises an electrical motor coupled to the dual structure for causing a respective movement between the dual structure and a mechanical squeezing member configured for forcing the liquid from the squeezable bag into the baby feeding device.

In various embodiments the deflating mechanism comprises a squeezing member detachably connectible to the dual structure.

In some embodiments the squeezing member comprises a pair of rods, arranged together in a tongs-like configuration.

In some embodiments the pair of tongs-like rods are pivotably connected each near a proximal end thereof to a common vertically movable member.

In some embodiments the pair of tongs-like rods are pivotably connected each near a proximal end thereof to a common rotatable member.

In some embodiments the common rotatable member is configured to move vertically simultaneously with its rotational motion. In various embodiments the electrical deflating device is further comprising a stirring member configured to maneuver the liquid content of the squeezable bag by repeatedly deforming the squeezable bag from its outer side from one bag contour to another, thereby shaking the liquid content inside the bag.

In some embodiments the squeezing member of the deflating device comprises two straps structured together and configured to depart one from another in mirroring arches (referred to herein also 'curves') when longitudinal ends thereof become closer and to come together and become straight when longitudinal ends thereof are in maximal separation.

In some embodiments the straps are connected, respectively, near longitudinal ends thereof to respective common vertically movable members.

In some embodiments the straps are connected, respectively, near longitudinal ends thereof to respective common rotatable members.

In some embodiments the common rotatable members are configured to rotate while moving vertically for a predetermined vertical extent.

In some embodiments the common rotatable members are configured to rotate without changing their position vertically.

Under another category, the disclosed solutions include a baby formula cartridge comprising (i) a frame; (ii) a flexible receptacle connected to the frame (iii) a liquid discharging port in liquid communication with the flexible receptacle and detachably connectable to a matching liquid receiving port of an inflatable baby feeding container, and a connective means matching a mutual connective means adapted for holding the cartridge with the inflatable baby feeding container connected to its liquid discharging port.

In yet additional category, the disclosed solutions include a method for finalizing a baby feeding formula and introducing it into a disposable inflatable baby feeding container, the method comprises (i) providing a cartridge comprising a flexible receptacle partially filled with a baby feeding formula in powder state; (ii) introducing a desired amount of water into the flexible receptacle and shaking the cartridge for dissolving the powder and mixing it with the water; (iii) providing for a liquid-proof connection between a liquid receiving port of the inflatable baby feeding container and a formula discharging port of the cartridge; (iv) providing a pressure difference between the flexible receptacle and the inflatable container such that a pressure inside the flexible receptacle is greater than a pressure inside the inflatable baby feeding container, thereby discharging the prepared formula from the flexible receptacle into the inflatable container; and (v) separating the inflatable container from the cartridge.

In a first broad aspect of the first category of solutions, the disclosed subject matter is exemplified by embodiments of a device configured for receiving prefilled supply containers, for facilitating squeezing the supply container (and in some embodiment for facilitating also the stirring of contained formula before squeezing the supply container), whereby a contained formula is transferred from the supply container into a baby feeding device.

In a second broad aspect of the first category of solutions, the disclosed subject matter is exemplified by device embodiments that allow a user to position a squeezable supply container in a filling position in the device, and to pour ingredients of a baby feeding formula (or a pre-prepared formula) into the supply container before applying a squeezing session on the prepared formula for transferring it from the supply container into a baby feeding device.

Referring now to device embodiments according to both said first and second broad aspects, the electrical deflating device comprises a mechanical arrangement for holding a dual structure comprising (i) a squeezable bag prefilled with a liquid content and said supply container; and (ii) an inflatable container constituting said baby feeding device; the device is further comprising an electrically operated deflating mechanism for deflating the squeezable bag thereby evacuating its liquid content into the inflatable container.

Referring now to device embodiments according to said first broad aspect, the device further comprising a housing and a doored space inside the housing adapted for receiving and holding the dual structure isolated from the exterior environment.

Even though the squeezable bag can contain a limited predetermined volume, in various embodiments the doored space is dimensioned to accommodate as twice volume as that: in an upper portion thereof, a squeezable bag filled with the maximal predetermined volume of liquid content, and in a lower portion thereof an inflatable container filled with said predetermined volume. In such embodiments, the total volume of the doored space is thus at least as twice the volume to be transferred from the squeezable disposable bag to the inflatable container.

In preferred embodiments of the disclosed subject matter the doored space has a suspension arrangement for holding the dual structure in vertical orientation with the squeezable bag up and the inflatable container down. In various embodiments of the disclosed subject matter, the suspension arrangement comprises two spaced apart horizontally oriented pegs protruding into the doored space near a top end thereof. The squeezable bag to be used in such embodiments, will be equipped with a pair of spaced apart apertures matching the pegs and allowing to suspend the bag on the pegs. The bag may thus be hanged on the pegs by mounting it within the doored space, with the pegs inserted respectively through the apertures.

In various preferred embodiments of the disclosed subject matter, the doored space comprises, in a midportion thereof, a clamping arrangement adapted to grip hold the dual structure in a connection region between the squeezable disposable bag and the baby feeding device. In various preferred embodiments of the disclosed subject matter the clamping arrangement comprises a first semicircular element protruding from a back wall of the doored space, and a second semicircular element protruding from a door of the doored space, the two semicircular elements are arranged such that when a dual structure having a cylindrical connection region between the squeezable disposable bag and the baby feeding device is suspended from a holder located near the top of the doored space, said cylindrical connection region is located adjacently to the first semicircular element, and, once the door is closed, becomes trapped between and firmly gripped by the first and the second semicircular elements, which together form a ring like clamp snugly fitting around the cylindrical connection region of the dual structure.

In embodiments of the disclosed subject matter that make use of either a pneumatic pressure for squeezing the squeezable disposable bag, or a vacuum pump for inflating the inflatable baby feeding device (by providing it with a negative external pressure) the first and second semicircular elements are created by semicircular recesses formed in facing edges of respective horizontal barrier portions, a first of which protruding from a back wall of the doored space and a second of which protruding from the door, such that when the door is closed and a dual structure is in position inside the doored space, the edges of the horizontal barrier portions meet and match together to form a sealed horizontal barrier between an upper region of the doored space (where the squeezable disposable bag is located) and a lower region of the doored space (where the inflatable baby feeding device is located), thereby minimizing fluid passage between the upper and lower regions of the doored space. In these embodiments, the semicircular recesses form together a circular hole through the horizontal barrier, the facing edges of which snugly fitting around the cylindrical connection region of the dual structure, once the door is closed. Since the hole in the barrier, is the only fluid communication path between the upper and lower regions of the doored space, when it is filled with the cylindrical connection region of the dual structure, fluid external to the dual structure cannot freely flow between the upper and lower regions of the doored space.

In the context of the present disclosure, said upper and lower regions of the doored space will be referred to, respectively, as the upper and the lower compartments of the doored space.

In various embodiments of the disclosed subject matter the inflatable container is equipped with a connector part detachably connected to a matching connector part with which the squeezable bag is provided. Once the two connector parts are plugged together, the squeezable bag and the inflatable container become mechanically secured against unintentional separation, and a liquid communication is provided through the connector, between the squeezable bag and the inflatable container. The connector part of the inflatable container (e.g. of the type disclosed by FIG. 2 of WO2006129302) is provided with a backflow preventer, a valve that allows fluids to flow from the squeezable bag into the inflatable container, but prevents backflow of fluids from the inflatable container into the squeezable bag (or to the outside, in case the squeezable bag is detached). The connector part of the squeezable bag may include a pressure valve to eliminate leakage of a liquid from the bag under internal or external pressures to which it is or might be exposed, before the squeezable container becomes secured to the inflatable container for filling it. In various embodiments the squeezable bag is supplied together with, and is connected by the mutual connector parts to the inflatable container, and is thus being plugged by the valve of the inflatable container, to be detached therefrom only after its liquid content has been squeezed into the inflatable container. The squeezable bag thus need not having a valve of its own.

In various embodiments of the disclosed subject matter, the electrical deflating device is provided with an electrical air pump adapted to provide a pressure greater than the atmospheric pressure to the upper compartment of the doored space. The provision of the pressure will squeeze the squeezable bag, forcing its liquid content to flow through the connection into the inflatable container, which is in the lower compartment, where the pressure is equal or smaller from the atmospheric pressure. In various embodiments of the disclosed subject matter, the electrical deflating device is provided with an electrical vacuum pump adapted to provide a negative pressure (a pressure smaller than the atmospheric pressure) to the lower compartment of the doored space. The provision of the vacuum will suck the liquid content from the squeezable bag and force it to flow through the connection into the inflatable container, which is in the lower compartment, where the pressure is smaller from the pressure at the upper compartment. In preferred embodiments of the disclosed subject matter, the electrical deflating device is provided with an electrical pump adapted to suck air from the lower compartment and to deliver it to the upper compartment, thereby providing a negative pressure (a pressure smaller than the atmospheric pressure) to the lower compartment of the doored space, and simultaneously providing a greater than the atmospheric pressure to the upper compartment. The pressure difference between the upper compartment and the lower compartment will force the liquid content from the squeezable bag into the inflatable container through their connection.

In preferred embodiments of the disclosed subject matter, the activation of the pumps is allowed only when the door of the doored space is closed. In these embodiments, the device is provided with a normally-open door-switch that remains open whenever the door is open, thereby disconnecting the electrical power from the pump. Once the door is closed it turn the switch on, and activation of the pump is enabled.

As a matter of design, the switch can be mechanical (e.g. pushbutton operated), or electronical, such as optically actuated (recognize the state of the door by optical means, e.g. a photodetector), magnetically actuated, capacitance or inductance activated. According to the type of switch inactivation of the switch by the door In various embodiments of the disclosed subject matter the squeezable container is made from the same piece of material from which the inflatable container is made and constitutes an extension of the inflatable container until the inflatable container is separated from the squeezable bag by a liquid sealing arrangement thereby becoming disconnected from liquid communication with the squeezable bag.

The inflatable container has a stretchable outer wall configured to inflate upon introduction of a pressurized liquid therein, from the squeezable bag.

Said disconnection of liquid communication between the squeezable bag and the inflatable container, takes place after the inflatable container has been inflated by the introduction of liquid squeezed from the squeezable bag.

In various embodiments, the liquid sealing arrangement comprises a squeezer member configured to seal the inflatable container by exerting pressure on the outer sides of the stretchable wall, thereby holding together its internally facing surfaces, leaving no space for liquid between internally facing surfaces of the stretchable wall, in regions thereof squeezed by the squeezer.

In some embodiments, the external squeezer is movable about the stretchable wall while closing any gaps in between, such that liquid contained between internally facing surfaces of the stretchable wall is forced out of the closing gaps.

In some embodiments, the squeezer is configured to be shifted along the stretchable wall, from a distal end of the squeezable bag part of the dual structure, remoter from the inflatable container part, to a proximal end of the squeezable bag part of the dual structure, closer to the inflatable container part.

In some embodiments, the squeezer is configured to hold a distal end of the squeezable bag part of the dual structure, remoter from the inflatable container part, thereby allowing the squeezable bag to be rolled about the squeezer, from is distal end to a proximal end thereof closer to the inflatable container part.

By relative moving between the squeezer (either by shifting or by rolling) and the squeezable bag, in a direction from the squeezable bag part of the dual structure towards the inflatable container part thereof, liquid contained in the squeezable bag is forced out of the closing gaps towards the inflatable container and the still spaced apart wall portions of the squeezable bag, thereby increasing the gap between the liquid containing portions of the stretchable wall, respectively. Once the inflatable container is satisfactorily inflated, e.g. acquires a sphere like shape, the moving of the squeezer can be stopped.

In a variety of embodiments, the squeezable bag part of the dual-structure remains a surplus next to squeezer and can be cut away, e.g. by scissors. In various embodiments, the squeezer may comprise a built-in cutting arrangement facilitating the removal of the empty squeezable bag part off the dual structure, once the inflatable container is satisfactorily inflated.

In some embodiments of the disclosed subject matter that make use of a movable closure for squeezing the liquid from the squeezable disposable bag and forcing it into the inflatable container part, the electrically operated deflating mechanism comprises an electrical motor coupled to the dual structure for causing a respective movement between the dual structure and a mechanical squeezing member configured for forcing the liquid from the squeezable bag into the baby feeding device. In various embodiments of the disclosed subject matter the squeezing member is detachably connectible to the dual structure, and can be removed from the device for maintaining the baby feeding container sealed once separated from the squeezable bag.

Referring now to device embodiments according to said second broad aspect, the electrical deflating device comprises a positioning arrangement for stabilizing the device in vertical orientation on an external surface, a suspension arrangement connected to the positioning arrangement and configured for receiving and holding a dual structure in vertical orientation, wherein the dual structure comprises (i) a squeezable bag to be filled with a liquid content for thereafter constituting said supply container; and (ii) an inflatable container constituting said baby feeding device, wherein said holding is with the squeezable bag up and the inflatable container down, the device is further comprising an electrically operated deflating mechanism for squeezing the squeezable bag thereby delivering its liquid content into the inflatable container.

In various embodiments of the disclosed subject matter, the suspension arrangement comprises a plurality (preferably between three and four) of spaced apart pegs protruding upwardly at or near a top end of the device. The squeezable bag to be used in such embodiments, will be equipped with a respective plurality of spaced apart apertures matching the pegs and allowing to suspend the bag on the pegs with a top end of the bag open for receiving powder and liquid ingredients of a baby feeding formula.

In various preferred embodiments of the disclosed subject matter, the positioning arrangement comprises, in a midportion thereof either a clamping arrangement adapted to grip hold the dual structure in a connection region between the squeezable disposable bag and the baby feeding device, or a stopper arrangement for preventing the inflatable container from moving upwardly when the squeezing is performed. In various preferred embodiments of the disclosed subject matter the stopper arrangement comprises a horizontally oriented U-shaped or C-shaped member sufficiently spacy for receiving the cylindrical connection region between the squeezable bag and the baby feeding device, yet sufficiently narrow for not allowing the baby feeding device path through.

As mentioned regarding said first broad aspect, in various embodiments of the disclosed subject matter the inflatable container is equipped with a connector part detachably connected to a matching connector part with which the squeezable bag is provided. Once the two connector parts are plugged together, the squeezable bag and the inflatable container become mechanically secured against unintentional separation (e.g. by providing the connector with a mechanical contrivance, e.g. of the type requiring push and rotate maneuvering for separation). Thus, a certain upwardly directed pull force exerted on the squeezable bag will not result with separation of the connector parts.

In various embodiments of the disclosed subject matter the squeezable container is made from the same piece of material from which the inflatable container is made and constitutes an extension of the inflatable container until the inflatable container is separated from the squeezable bag by a liquid sealing arrangement thereby becoming disconnected from liquid communication with the squeezable bag. In such embodiment the positioning structure comprises a clamping arrangement adapted to grip hold the inflatable container from moving upwardly when a pulling force is exerted on it by the bag portion upon squeezing.

The inflatable container has a stretchable outer wall configured to inflate upon introduction of a pressurized liquid therein, from the squeezable bag.

Said disconnection of liquid communication between the squeezable bag and the inflatable container, takes place after the inflatable container has been inflated by the introduction of liquid squeezed from the squeezable bag.

In various embodiments, the liquid sealing arrangement comprises a squeezer member configured to seal the inflatable container by exerting pressure on the outer sides of the stretchable wall, thereby holding together its internally facing surfaces, leaving no space for liquid between internally facing surfaces of the stretchable wall, in regions thereof squeezed by the squeezer.

In some embodiments, the external squeezer is movable about the stretchable wall pressing together under opposite sides thereof for closing any gaps in between, such that liquid contained between internally facing surfaces of the stretchable wall is forced out of the closing gaps.

In some embodiments, the squeezer is configured to be shifted along the stretchable wall, from a distal end of the squeezable bag part of the dual structure, remoter from the inflatable container part, to a proximal end of the squeezable bag part of the dual structure, closer to the inflatable container part.

In some embodiments, the squeezer is configured to hold a distal end of the squeezable bag part of the dual structure, remoter from the inflatable container part, thereby allowing the squeezable bag to be rolled about the squeezer, from its distal end to a proximal end thereof closer to the inflatable container part.

In the context of the disclosed subject matter, the term moving, when referred to the squeezer, refers to the moving of the squeezer towards the inflatable container either by shifting, or by rolling, as required by the embodiment type of a squeezer of interest.

By moving the squeezer in a direction from the squeezable bag part of the dual structure towards the inflatable container part thereof, liquid contained in the squeezable bag is forced out of the closing gaps towards the inflatable container and the still spaced apart wall portions of the squeezable bag, thereby increasing the gap between the liquid containing portions of the stretchable wall, respectively. Once the inflatable container is satisfactorily inflated, e.g. acquires a sphere like shape, the moving of the clamp can be stopped.

In a variety of embodiments, the squeezable bag part of the dual-structure remains a surplus next to the clamp and can be cut away, e.g. by scissors. In various embodiments, the clamp comprises a built-in cutting arrangement facilitating the removal of the empty squeezable bag part off the dual structure, once the inflatable container is satisfactorily inflated.

In embodiments of the disclosed subject matter that make use of a movable closure for squeezing the liquid from the squeezable disposable bag and forcing it into the inflatable container part, the electrically operated deflating mechanism comprises an electrical motor coupled to the dual structure for causing a respective movement between the dual structure and a mechanical squeezing member configured for forcing the liquid from the squeezable bag into the baby feeding device. In various embodiments of the disclosed subject matter the squeezing member is detachably connectible to the dual structure, and can be removed from the device for maintaining the baby feeding container sealed once separated from the squeezable bag.

In a third broad aspect, the disclosed subject matter relates to a baby formula cartridge comprising (i) a frame (the frame is detachably connectible to an external matching holder which constitutes a member of a deflating device according to a first aspect of the disclosed subject matter); (ii) a flexible receptacle connected to the frame (iii) a valved liquid discharging port in liquid communication with the flexible receptacle and detachably connectable to a matching liquid receiving port of an inflatable baby feeding container, and a connective means matching a mutual connective means adapted for holding the cartridge with the inflatable baby feeding container connected to its liquid discharging port.

In a fourth broad aspect the disclosed subject matter relates to a method for finalizing a baby feeding formula and introducing it into a disposable inflatable baby feeding container, the method comprises (i) providing a cartridge comprising a flexible receptacle partially filled with a baby feeding formula in powder state; (ii) introducing a desired amount of water into the flexible receptacle and shaking the cartridge for dissolving the powder and mixing it with the water; (iii) providing for a liquid-proof connection between a liquid receiving port of the inflatable baby feeding container and a formula discharging port of the cartridge; (iv) providing a pressure difference between the pressure inside the flexible receptacle and the pressure inside the inflatable container thereby discharging the prepared formula from the flexible receptacle into the inflatable container; and (v) separating the inflatable container from the cartridge.

A fifth broad aspect of the disclosed subject matter are embodiments of liquid receiving port for inflatable baby feeding containers to be filled by the deflating device disclosed as part of said first and second broad aspects, the liquid receiving port comprises a clamping arrangement for securing an open end of a stretchable container of the inflatable baby feeding container around a body of the liquid receiving port, at least one aperture in a wall of said body, and a diaphragm disposed in front of the at least one aperture, whereby liquid pressure from inside the stretchable container presses the diaphragm towards the wall, thus sealing the aperture by the diaphragm, whereby liquid pressure from outside the stretchable container presses the diaphragm away from the wall, thus creating a temporal gap between the wall and the diaphragm, through which the liquid from outside can escape into the stretchable container.

DETAILED DESCRIPTION OF THE DISCLOSED SUBJECT MATTER

The presently disclosed subject matter will be further explained by the accompanying Figures. With specific reference now to the figures in detail, it is stressed that the particulars shown are by way of example and for purposes of illustrative discussion of one or more preferred embodiments of the presently disclosed subject matter, and are presented in the cause of providing what believed to be the most useful and readily understood description of the principles and conceptual aspects of the disclosed subject matter. In this regard, no attempt is made to show in the figures structural details of the disclosed subject matter in more detail than necessary for understanding the basics of the disclosed subject matter, the description taken with the drawings making apparent to those skilled in the art how several forms of the disclosed subject matter may be embodied in practice.

BRIEF DESCRIPTION OF THE FIGURES

FIG. 5A illustrates a perspective view of manually operated deflating device for transferring a liquid from a supply container into a baby feeding device, according to a third embodiment of the disclosed subject matter.

FIG. 5B illustrates an enlarged view of the connective wheel region in the embodiment illustrated in FIG. 5B, with both clamping-rods engaged and held together by the connective wheel.

FIG. 5C illustrates a side view of the embodiment illustrated in FIG. 5B.

FIG. 5D illustrates a front view of the embodiment illustrated in FIG. 5B.

FIG. 5E illustrates a top view of the embodiment illustrated in FIG. 5B.

FIG. 5F illustrates an electrical deflating device for transferring a liquid from a supply container into a baby feeding device, according to a fourth embodiment of the disclosed subject matter.

FIG. 5G illustrates an electrical deflating device for transferring a liquid from a supply container into a baby feeding device, according to a fifth embodiment of the disclosed subject matter.

FIG. 5H illustrates an electrical deflating device for transferring a liquid from a supply container into a baby feeding device, according to a sixth embodiment of the disclosed subject matter.

FIG. 5I illustrates an electrical deflating device for transferring a liquid from a supply container into a baby feeding device, according to a seventh embodiment of the disclosed subject matter.

FIG. 6A illustrates a vertical cross section of a liquid receiving port of a baby feeding device constituting the inflatable container part of the dual structure according to various embodiments of the presently disclosed subject matter.

FIG. 6B illustrates an isometric view of the liquid receiving port illustrated by FIG. 6A.

FIG. 6C illustrates a vertical cross section of the liquid receiving port of FIG. 6A mounted in an exemplary embodiment of inflatable container according to the presently disclosed subject matter.

FIG. 7A illustrates in an exploded vertical cross section view three members of another embodiment of a liquid receiving port of a baby feeding device constituting the inflatable container part of the dual structure according to various embodiments of the presently disclosed subject matter.

FIG. 7B illustrates in isometric view the valve retaining member of the liquid receiving port illustrated by FIG. 7A.

FIG. 7C illustrates isometric view of the liquid receiving port illustrated by FIG. 7A with its members mounted together.

FIGS. 7D and 7E illustrate respectively, two vertical cross section views of the liquid receiving port illustrated by FIG. 7A, with its members mounted together, the two views differ in the operative state of the valve membrane member.

DETAILED DESCRIPTION OF THE FIGURES

It will be evident to those skilled in the art that the disclosed subject matter is not limited to the details of the foregoing illustrative embodiment and that the presently disclosed subject matter may be embodied in other specific forms without departing from the spirit or essential attributes thereof. The present embodiment is therefore to be considered in all respects as illustrative and not restrictive, the scope of the disclosed subject matter being indicated by the appended claims rather than by the foregoing description, and all changes which come within the meaning and range of equivalency of the claims are therefore intended to be embraced therein.

Figure 1A:
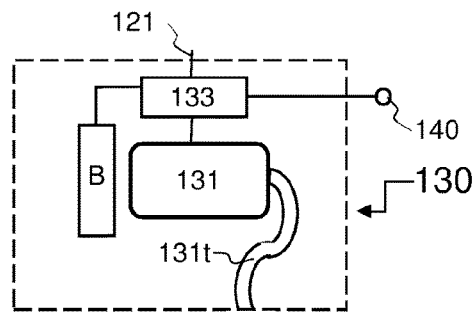
FIG. 1A illustrates a schematic view of an electrical mechanism of the device of FIG. 1.
Figure 1:
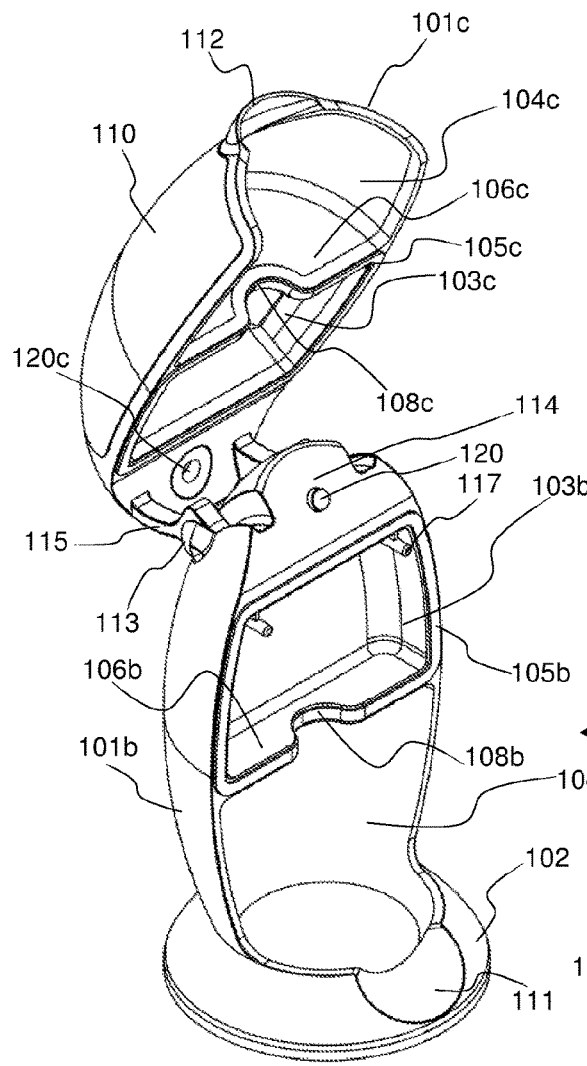
FIG. 1 illustrates an open state view of a deflating device for transferring a liquid from a supply container into a baby feeding device, according to a first embodiment of the presently disclosed subject matter.
Figure 2:
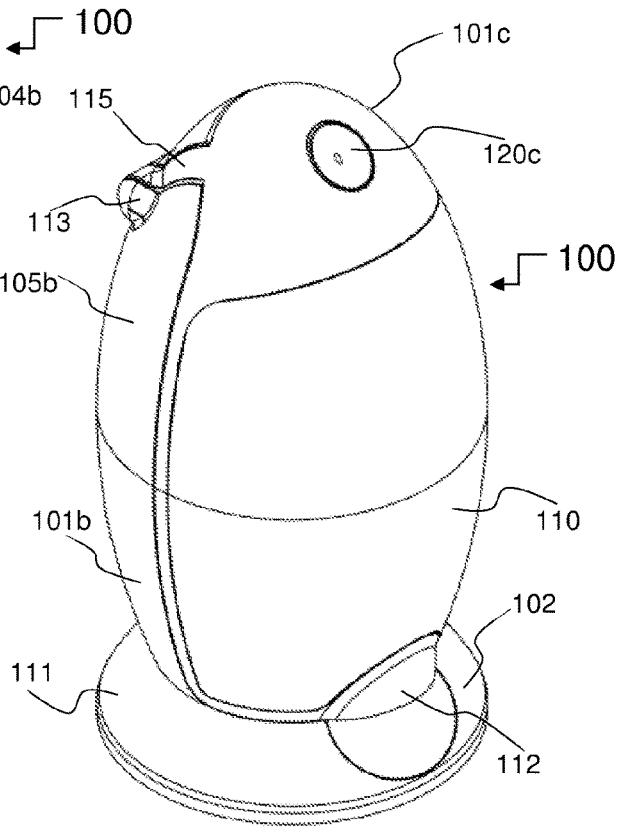
FIG. 2 illustrates the device illustrated by FIG. 1 in a closed state view.

FIGS. 1 and 2 illustrate, in an open state (FIG. 1) and in a closed state (FIG. 2), an electrical deflating device 100 for hands free transferring a liquid from a supply container into a baby feeding device according to a preferred embodiment of the disclosed subject matter.

The electrical deflating device comprises a housing 101$b$ and 101$c$, a doored space (103$b$; 103$c$; 104$b$; 104$c$) inside the housing, adapted for receiving and holding a dual structure (300, shown in FIG. 3) comprising (i) a squeezable bag 301 prefilled with a liquid content and constituting said supply container; and (ii) an inflatable container 311 constituting said baby feeding device; and an electrically operated deflating mechanism (e.g. the electrical mechanism 130 shown in FIG. 1A, in cooperation with the mechanical arrangements illustrated in FIG. 1) for squeezing the squeezable bag thereby delivering its liquid content into the inflatable container.

In the illustrated embodiment, the electrical deflating device 100 comprises a main body 101$b$ having a base part 102 for supporting the device on a horizontal surface such as a table. A door 101$c$ is hinged to the main body 101$b$ by a pair of hinges 115 connected to the door 101$c$ near a top end thereof and hinged to the main body 101$b$ each within a respective hinging capsule 113 formed near a top end of the main body 101$b$. The hinges are dimensioned and configured such that when the door 101$c$ is nearly fully open, it remains in its open position (e.g. by the gravitational force acting on its weight) without requiring the user to hold it. The user can then suspend the dual structure shown by FIG. 3, on the horizontal pegs 117, and then close the door.

Even though the squeezable bag 301 can contain a limited predetermined volume, the doored space is dimensioned to accommodate as twice volume as that: in an upper portion thereof 103$b$ and 103$c$, a squeezable bag 301 filled with the maximal predetermined volume of liquid content, and in a lower portion thereof an inflatable container 311 filled with said predetermined volume. The total volume of the doored space is thus at least as twice the volume to be transferred from the squeezable disposable bag 301 to the inflatable container 311.

In preferred embodiments of the disclosed subject matter the doored space has a suspension arrangement for holding the dual structure in vertical orientation with the squeezable bag up and the inflatable container down. In various embodiments of the disclosed subject matter, such as the one illustrated here, the suspension arrangement comprises two spaced apart horizontally oriented pegs 117 protruding into the doored space 103$b$ near a top end thereof. The squeezable bag 301 to be used in such embodiments, will be equipped with a pair of spaced apart apertures 304 matching the pegs 117 and allowing to suspend the bag on the pegs. The bag may thus be hanged on the pegs by mounting it within the doored space, with the pegs 117 inserted respectively through the apertures 304.

In various preferred embodiments of the disclosed subject matter, the doored space comprises, in a midportion thereof, a clamping arrangement adapted to grip hold the dual structure 300 in a connection region between the squeezable disposable bag 301 and the baby feeding device 311. In various preferred embodiments of the disclosed subject matter the clamping arrangement comprises a first semicircular element 108$b$ protruding from a back wall 101$b$ of the doored space, and a second semicircular element 108$c$ protruding from a door 101$c$ of the doored space, the two semicircular elements 108$b$ and 108$c$ are arranged such that when a dual structure 300 having a cylindrical connection region 305 between the squeezable disposable bag 301 and the baby feeding device 311 is suspended from a holder 117 located near the top of the doored space, said cylindrical connection region 305 is located adjacently to the first semicircular element 108$b$, and, once the door 101$c$ is closed, becomes trapped between and firmly gripped by the first and the second semicircular elements 108$b$ and 108$c$, which together form a ring like clamp snugly fitting around the cylindrical connection region 305 of the dual structure 300.

The electrical deflating device comprises an electrical mechanism such as the mechanism 130 shown by FIG. 1A. In the illustrated embodiment the mechanism 130 is concealed within a compartment formed in the main body 101$b$, behind a wall portion 114. A push button 120 is located in the wall portion 114 and is connected by a line 121 to a controller 133 of the device. When the door 101c is closed, the pushbutton 120 is engaged by an actuator 120c formed near the top of the door 101c, operable by a user. Once pressed by a user, and in condition that a door sensor 140 (may be located e.g. within the hinge capsule 113) communicates to the controller 133 that the door 101c is closed, the controller 133 connects the battery B to power the electrical air pressure pump 131. Pumped air flows then from the pump into the upper space 103b and 103c, through air tube 131t, thereby increasing the air pressure in the upper compartment 103b 103c of the electrical deflating device. The space 103b and 103c is sealed from the outer atmosphere by means of top, bottom and side walls constituting a part of the main body 101b and the door 101c, and by means of mirroring gaskets 105b and 105c (e.g. formed from rubber, silicon or the like) which fit together when the door 101c is closed. The door 101c and the body 101b are preferably provided with a means (either mechanical or magnetic) for pressing and maintaining the door tightly closed. Magnetic elements may be concealed within the facing edges of the body and the door for mutually interact magnetically for maintaining the door tightly closed. The gaskets 105b and 105c, fits also around the cylindrical neck 305 of the squeezable bag 301. A horizontal wall 106b and 106c divides the doored space into an upper space 105b 105c, and a lower space 104b 104c. When the door 101c is closed and the cylindrical neck 305 of the squeezable bag is held between the first and second semicircular elements 108b and 108c that are formed, respectively, as semicircular indentations in the horizontal wall parts 106b and 106c.

Ergonomically designed recess 111, is provided in the base part 102 of the main body 101b for facilitating the access to an ergonomic grip handle 112 formed near the bottom of the door 101c, by which the door 101c can be opened and lifted.

The door 101c is preferably provided with a transparent front panel 110, through which a user can supervise the operation of the device and stop the operation once a desired amount of liquid has been transferred into the inflatable container. This can be indicated e.g. by a satisfying volume of the inflatable container.

In various embodiment of the disclosed subject matter the electrical operation of the device can be turned off upon a second press on the activation button 120c. In other various embodiments of the disclosed subject matter the electrical operation of the device can be turned off by opening the door 101c. The opening is communicated to the controller by the door sensor 140.

Figure 3:
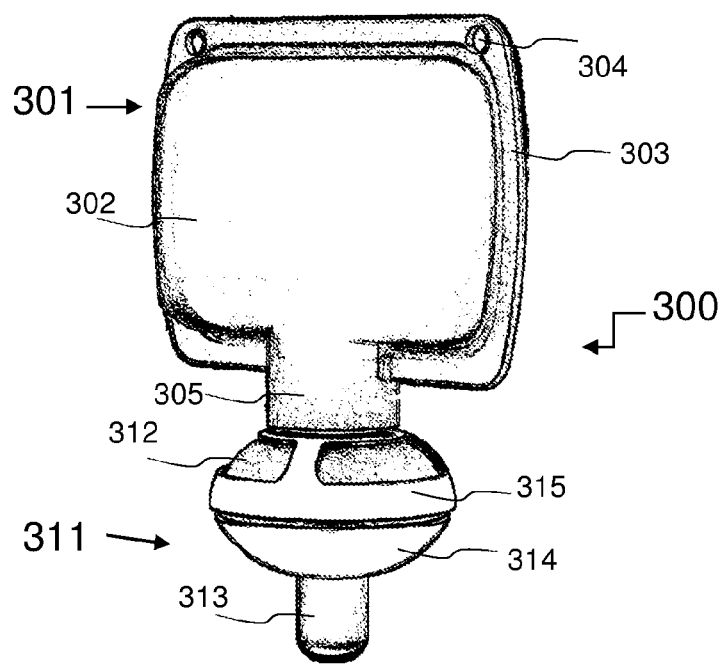
FIG. 3 illustrates a dual structure comprising a squeezable bag and an inflatable baby feeding container configured for hands free transferring of liquid from the bag to the container by means of the device embodiment of FIG. 1.

FIG. 3 illustrates a dual structure 300 comprising a squeezable bag structure 301 and an inflatable baby feeding container 311 configured for hands free transferring of liquid from a squeezable bag 302 (of the squeezable bag structure 301) to the container 311 by means of the device embodiment of FIG. 1. The squeezable bag structure 301 may be provided to the user as a cartridge comprising a rigid or semi-rigid frame 303 and a flexible bag 302 that can be formed of nylon, aluminum foil, or the like. The flexible hag 302 (which constitutes a receptacle for the baby feeding formula), merges with a cylindrical rigid or semi-rigid neck 305. Within the cylindrical neck 305 there is a normally-closed valve that opens when the neck is connected (e.g. by mutual threading, or by any other acceptable fitting with which the bag and the baby feeding device are mutually equipped) to a liquid inputting port (not shown here, for example of the details of the liquid inputting port see for example WO2006129302 FIG. 2) of the inflatable baby feeding device 311, and allows for liquid communication between the bag 302 and an inflatable balloon-like member 312 of the baby feeding device 311.

The frame 303 of the squeezable bag 301 is provided with a pair of apertures 304, in match with the pair of horizontal pegs 117 of the electrical deflating device, whereby the dual structure 300 may be positioned inside the doored space 103b 104b 103c 104c, suspended on the pegs 117.

In the illustrated embodiment the inflatable member 312 of the baby feeding device is protected by semi-rigid plastic frame members 314 and 315, the plastic frame member 314 is connected and provides mechanical support to a baby feeding nipple 313 of the baby feeding device. The plastic frame member 315 provides mechanical support to the liquid inputting port (hidden in the drawing, within the semi-rigid-neck 305) with which the squeezable bag 301 is detachably connected.

Figure 4:
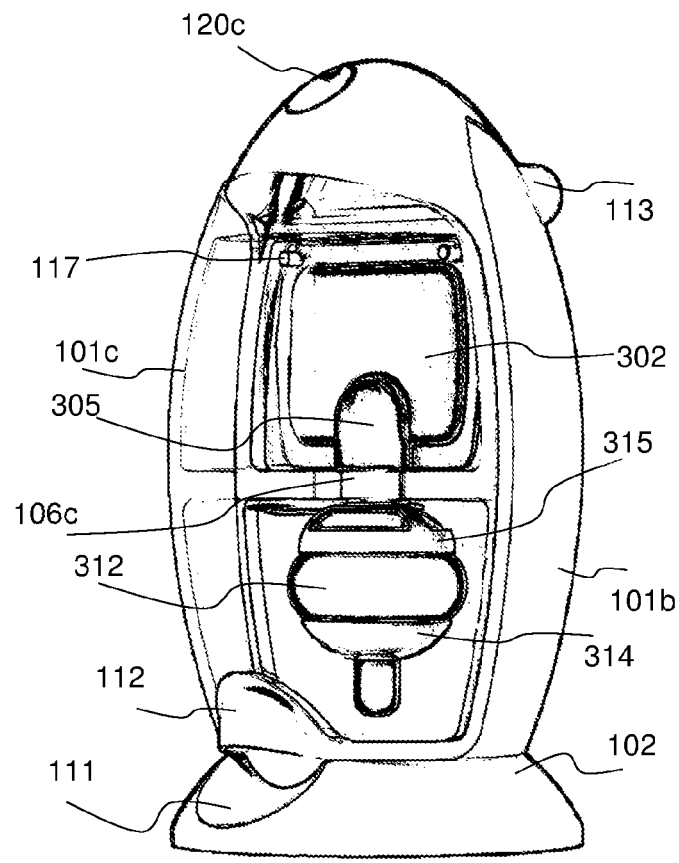
FIG. 4 illustrates the dual structure of FIG. 3 in position within the device of FIG. 1, at the end of the handsfree transferring process.

FIG. 4 illustrates the dual structure 300 of FIG. 3 in position within the device of FIG. 1, in a typical view at the end of the handsfree transferring process. The door 101c has a transparent front panel, allowing a through vision into the device while closed. Inside the device, the dual structure 300 is suspended on the horizontal pegs 117. The pegs 317 penetrate respectively through the apertures 304 formed in the frame 303 of the squeezable bag 301, and the cylindrical neck 305 of the dual structure is tightly gripped by the semicircular indentations 108b and 108c formed in the horizontal wall parts 106b and 106c. The inflatable baby feeding device 111 is suspended from the cylindrical neck 305 to which its liquid inputting port is detachably connected. The inflatable baby feeding device 311 is situated within the lower compartment 104b and 104c of the electrical deflating device, isolated from the air contained by the upper compartment 103b and 103c.

The figure illustrates the flexible receptacle 302 after completion of the handsfree transferring of liquid, when it is already empty from the liquid (for comparison, see its full of liquid view, shown by FIG. 3). The baby feeding device 311 is shown with the balloon-like member 312 in its inflated state, full of the liquid that was forced into it from the bag 302 through the cylindrical neck 305 and through the liquid inputting port, by means of the higher air pressure created in the upper space 103b and 103c during the liquid transferring process. Upon completion of the liquid transferring process, a user can lift the door 101c open by pulling the hand grip 112, then remove the dual structure 300 off the horizontal pegs 117, and finally, separate the baby feeding device 311 from the cylindrical neck 305 of the squeezable bag 301 and handle it to a baby to be fed.

Figure 5:
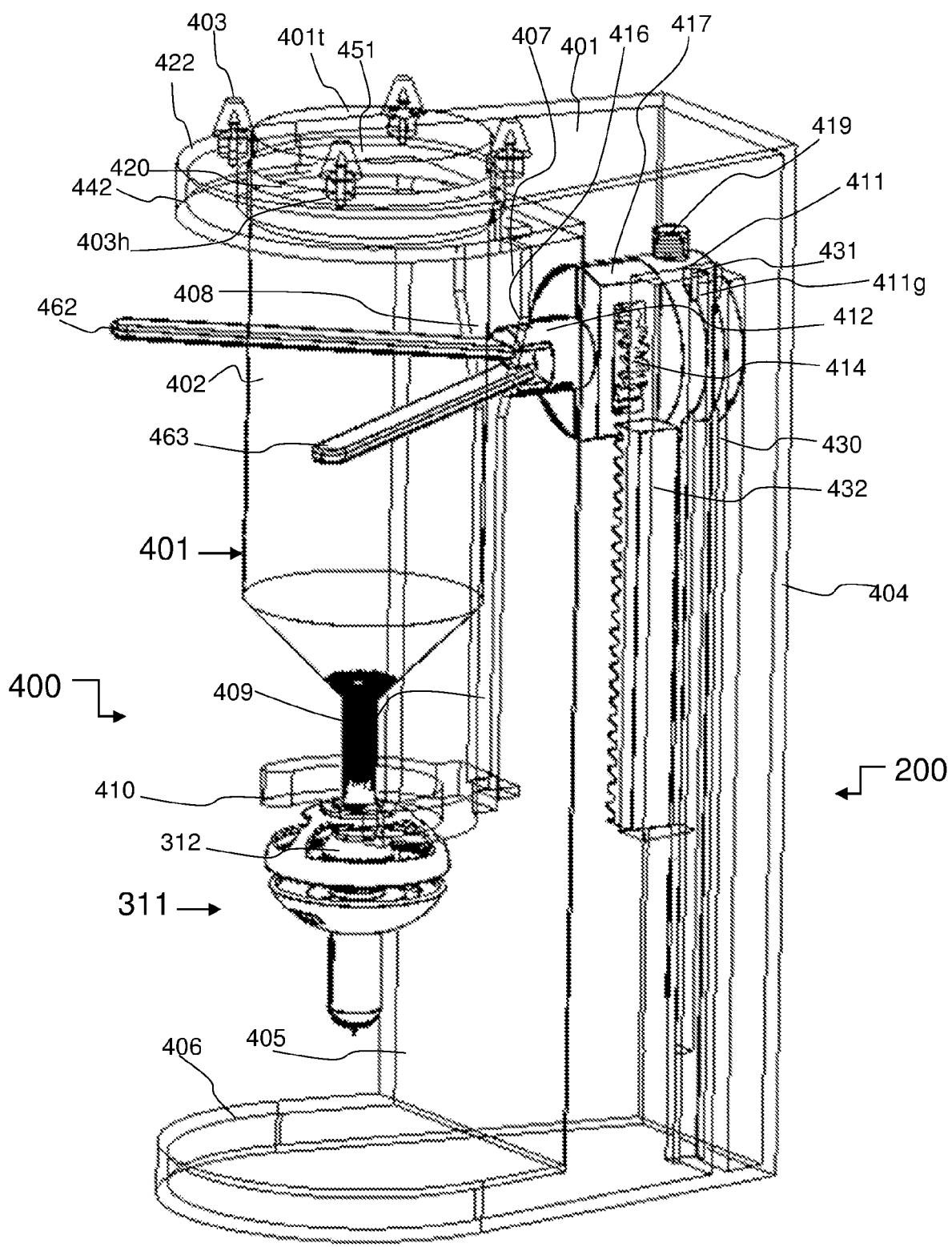
FIG. 5 illustrates an electrical deflating device for hands free transferring a liquid from a supply container into a baby feeding device, according to a second embodiment of the disclosed subject matter. A dual structure comprising a squeezable bag and an inflatable baby feeding container are shown in position on the device.
Figure 5:
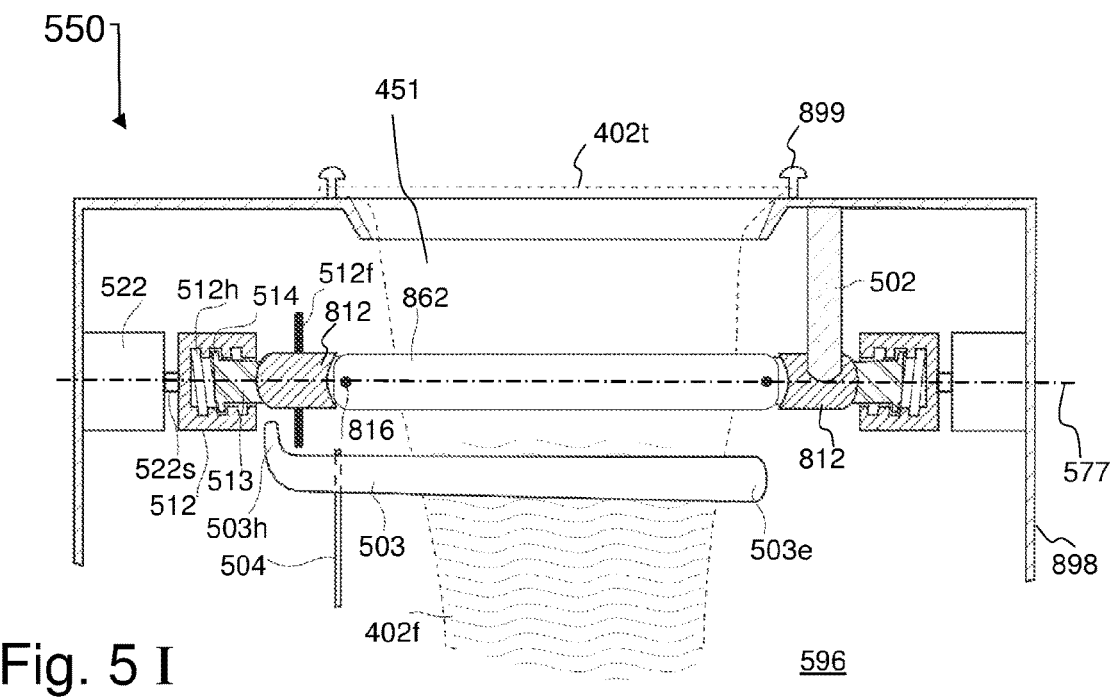

FIG. 5 illustrates an electrical deflating device 200 for hands free transferring a liquid from a supply container 401 into a baby feeding device 311, according to a preferred embodiment of the second broad aspect of the disclosed subject matter. A dual structure 400, comprising a squeezable bag 402 and an inflatable baby feeding container 312, is shown in position on the device 200. The device comprises a base part 406 constituting a positioning arrangement, and a top part 442 having a hole 420 having four upwardly oriented pegs 403 spaced around the hole and constituting a suspension arrangement. The suspension arrangement is connected to and mechanically supported by the positioning arrangement 406 (e.g. through vertical wall members 404 and 405) and is configured for receiving and holding the dual structure 400 in vertical orientation, wherein the dual structure 400 comprises (i) a squeezable bag 402 to be filled with a liquid content, and once filled constituting said supply container; and (ii) an inflatable container 312 constituting (with the aid of the nipple 313 and the frame members 314 and 315) said baby feeding device, wherein said holding is with the squeezable bag 402 up and the inflatable container 312 down, the device is further comprising an electrically operated deflating mechanism for squeezing the squeezable bag 402 thereby delivering its liquid content into the inflatable container.

The squeezable bag 402 comprises at a top end thereof, 401t, holes 403h, which in the illustrated embodiment are formed in a body of the bag near its top end 401t (and which in other embodiments may be formed in special strips extending from the squeezable bag), said holes being adapted for insertion of the pegs, respectively, for suspending the bag 402 on the pegs 403, and facilitation introduction of water and baby feeding formula powder into the bag through its open top 451. Once the formula is finalized by a user (in some embodiments of the invention a stirrer is provided as part of the mechanism of the device, so in such embodiments the user is only required to pour the ingredients into the bag 402, while stirring is performed automatically), the user can switch-on the electrically operated deflating mechanism (actuation switch, electrical parts and circuits, may be designed by those skilled in the art of electrical domestic devices based on common knowledge and are thus not illustrated).

The electrically operated deflating mechanism for squeezing the squeezable bag 402, comprises a pair of bars (rods) 462 and 463 hinged each at a proximal end thereof to a common hinge 416 said pair of commonly hinged bars constitute a tongs-like mechanism. The hinge is formed in a recess in a rotatable body 412, and initially is oriented vertically. The rotatable body is connected to a cogwheel 414 such that upon rotation of the cogwheel the rotatable body will rotate as well. The cogwheel 414 and the rotatable body 412 are rotatably fixed to a cylindrical part 417, the cylindrical part being partially truncated such that a portion of the cogwheel 417 is exposed and hence couplable to a vertically oriented teethed rod 432. As can be appreciated, once the truncated cylinder part 417 moves downwardly, the exposed portion of cogwheel 417 becomes engaged with the teethed rod 432 and rotates counterclockwise (for a viewer facing the device from the front), in response to the linear downward motion of the cylindrical part 417.

Once a liquid formula has been introduced into the bag 402, tongs-like rods 462 and 463 may be brought together, for closing the bag 402 above the level of the liquid content. The bringing together of the tongs-like rods may be performed either manually before switching the device on, or automatically. For automatically bringing the tongs-like rods together, the vertical wall 405 is provided with a slit 409, the slit is wide at its upper portion 407, gradually narrows at a mid-portion thereof 408, and has a fixed width all along its lower portion 409. At the beginning of the preparation, the truncated cylindrical part 417 is located near the top of the device, and the tongs-like rods 462 and 463 thus emerge through the upper portion 407 of the slit. The upper portion 407 of the slit is sufficiently wide to allow the tongs-like rods spread apart, which in turn allows the bag 402 to hang from the pegs 403 fully deployed between the tongs-like rods 462 and 463. Upon activation of the squeezing process, the truncated cylindrical part 417 moves down as a function of rotation of the threaded transmission rod 419, bringing the tongs-like rods into the narrowing region 408 of the slit, thereby gradually forcing the tongs-like rods together, and in turn, squeezing and closing the bag 402 from above the contained baby-feeding formula. Further downward motion of the truncated cylinder 417 will bring the cogwheel into engagement with the teethed rod 432, thereby rotating the rotatable member 412 and the tongs-like rods. Rotation of the closed tongs-like rods forces the squeezable bag 402 to roll over the tongs-like rods 462 and 463, tearing the bag off the pegs 403. During the rolling (winding) of the bag 402 around the closed tongs-like rods, upward motion of the baby feeding device 311 is prevented due to the stopper 410 (in the illustrated embodiment a horizontally oriented C-shaped stopper), which is connected to the vertical wall 405 near the bottom end of the slit 409.

The rolling and winding of the bag will thus seal the bag 402 against spill of the liquid formula through the top end of the bag, and will squeeze its content, forcing it into the inflatable container.

The truncated cylindrical member 417 is fixed to a grooved cylindrical body 411 which is coupled to a threaded transmission rod 419. Rotation of the threaded transmission rod 419 clockwise or counterclockwise (as required per a current mode of operation of the device) will be transformed into respective linear motion of the cylindrical body 411, downwardly during a squeezing session, and upwardly, after squeezing, for returning the device to its initial state, with the tongs-like rods emerging from the wide upper end 407 of the slit 409.

The cylindrical body 411 has a vertically extending side groove 411g (e.g. having a T-like lateral cross section contour), matching a vertical track 431 protruding from a vertical rod 430. The track-and-groove arrangement provides for smooth linear motion of the cylindrical body 411 and of the truncated cylindrical part 417, whereby turning of the cylindrical part 417 sideways due to rotation of the threaded transmission rod 419, is avoided.

The teethed rod 432 is connected to the vertical rod 430 in a predetermined has a predetermined length adapted to cause a desired number of turns of the cogwheel 414, for rolling the bag 402 and squeezing its entire content into the inflatable container 312.

The threaded transmission rod 419 is coupled to an electrical motor (not illustrated) controlled by respective electronics. In some embodiments of the disclosed subject matter the electronics includes sensor means for automatic stop of the motor at the intended topmost and lowermost positions of the truncated cylinder 417, and for reversing the rotation direction of the motor when the device is returned to the initial position, upon user's instruction, following an accomplished filling by squeezing session.

The electrical motor may be located near the bottom of the device, or, as a matter of design, in any desired location between the walls 404 and 405.

In various embodiments of the disclosed subject matter the electrical deflating device further comprises a stirring member configured to maneuver the liquid content of the squeezable bag by repeatedly deforming the bag 402 from its outer side, thereby shaking its content.

The stirring member may be for example an excentre wheel coupled by respective transmission cogs to a vertical teethed rod (similar to rod 432, or constituting an extension upwardly extending from the top of the illustrated rod 432), such that before the tongs-like rods 462 and 463 begin squeezing and rolling the bag 402 (i.e. before becoming forced to come together they enter the slit 409 while moving downwardly and), the excentre knocks the bag wall from outside, causing the liquid inside the bag shake and become more uniformly mixed with a dissolving baby feeding formula. The excentre may be located immediately above the tongs-like rods 462 and 463, and may be configured to stop its downward motion and the resultant rotation, immediately when the tongs-like rods come together and close the bag 402.

FIG. 5A-5E illustrate several views of a manually operated deflating device 250 for transferring a liquid from a supply container 401 into a baby feeding device 311, according to a preferred embodiment of the second broad aspect of the disclosed subject matter. A dual structure 400 comprising a squeezable bag 402 and an inflatable baby feeding container 312 can be suspended on the pegs 499, similarly to the suspension of the dual structure 400 on the device shown by FIG. 5. The squeezable bag 402 comprises at a top end thereof, 401*t*, holes (or special strips with holes), adapted for insertion of the pegs, respectively, for suspending the bag 402 on the pegs 499, thus facilitating introduction of water and baby feeding formula powder into the bag through its open top 451.

The manually operated device 250 comprises surrounding walls 498*a*-498*d* which create a space 496 for the dual structure 400 to be suspended. The surrounding walls may (yet not necessarily do) end with a base wall 497 for closing the space 496 from bottom. Two opposite walls 498*a* and 498*b* from the four, comprise through-grooves 495*a* and 495*b*, respectively, near a top end of the walls. The through-grooves 495*a* and 495*h* use as tracks for a pair of clamping-rods 494*a* and 494*h*, each of which crosses the opposite walls 498*a* and 498*b* through the through-grooves, thus can be shifted laterally from a respective end of the through-grooves toward a mid-portion thereof. In the mid portion of each of the through-grooves, there is a rotatable connective wheel 993, trapped such that it can only rotate, but is immovable laterally along the groove. The connective wheel 490 comprises mutual releasable connective means with each of the clamping-rods. The releasable connective means are configured to engage between the wheel and the clamping-rods once the clamping-rods are brought together by user's action. When both clamping-rods 494*a* and 494*b* become connected with the wheels 490, respectively, the rods become rotatable together with rotation of the wheels 490 about the common axis of rotation 490*a*, of the wheels 490.

One example of mutual connective means between the wheels 490 and the clamping-rods 494*a* and 494*b*, is a plurality (at least two) recesses 490*r* formed in the wheels, contoured to snugly fit around a tubular portion 494*t* of the clamping-rod, gripping it against unintentional separation from the wheel.

Once a dual-structure 400 is suspended from the vertical pegs 499, and after filling and finalizing the formula, bringing the clamping-rods 494*a* and 494*b* together, will make the top end of the squeezable supply bag 402 clamped between the clamping-rods at the area along the common rotation axis 490*a* between wheels 490. In various embodiments of the disclosed subject matter the clamping rods may have each a star like cross section design transversely to its longitudinal axis. The clamping-rods 494*a* and 494*b* can then be rotated by a user, thereby rolling the squeezable bag 402 and reducing its volume. For making the clamping-rods rotate, the user can use the flat ends 494*e* of the clamping-rods as handles for facilitating the rotation, while exerting a squeezing force on the liquid contained by the squeezable bag. Leveraging rods 459 may be provided perpendicularly to the clamping-rods, for keeping the flat ends 494*e* in vertical orientation when disengaged from the wheels 490, and for easing rotation of the clamped complex (i.e. wheels 490, clamping-rods 494*a* 494*b*, and a squeezable bag 402 clamped by) by leveraging the manual force acting on clamping-rods 494*a* 494*b* for rolling the squeezable bag and winding it on the clamping-rods. Motion of the baby feeding device 311 upwardly due to the rolling operation, is disabled due to a stopper (not shown in FIG. 5B), such as the horizontal C-shaped stopper 410 in FIG. 5A. The stopper may be connected to a surface of an upright surrounding wall 498*a* (or any of 498*b*-498*d*) facing the space 496, near a mid-portion of the wall's height. Accordingly, the rolling operation stretches the squeezable bag in the vertical direction which in turn tends to reduce its internal volume, thereby forcing the contained liquid from the bag into the container 311. Upon clamping, a predetermined amount of air will unavoidably become trapped between the clamped end of the squeezable bag and the contained liquid. Due to the trapped air, rolling the clamping-rods will result in progressive reduction in the volume of the squeezable bag and with increase in the pressure of the trapped air, whereby the trapped air will be pressing on the liquid, thus allowing the user to force even last remaining of the liquid from the squeezable bag into the container. The walls of the device can be made of a transparent material comprise a transparent region allowing to inspect the squeezable bag, such that a user can view the emptying of the squeezable bag and terminate the squeezing timely, i.e. before any amount of trapped air is forced into the baby feeding container.

FIG. 5H illustrates the upper portion of an electrical deflating device 850 for transferring a liquid from a supply container 401 (annotations mentioned in the description of this Fig. that are not included in the drawing relate to items annotated by theses annotations in FIG. 5 or in other Figs, and can be included in the embodiment and be treated by a user in a similar manner as in the embodiments in which they appear and described), into a baby feeding device 311, according to another preferred embodiment of the second broad aspect of the disclosed subject matter. A dual structure 400 comprising a squeezable bag 402 and an inflatable baby feeding container 312 can be suspended on pegs 899, similarly to the suspension of the dual structure 400 on pegs 499 of the device shown by FIG. 5A, or on pegs 403 of the device shown by FIG. 5. In various embodiments of the disclosed subject matter, catching means other than pegs may be used for suspending the dual structure. Such means may include hooks, spring biased clamps, outwardly-bent edges, or the like. The squeezable bag 402 comprises at a top end thereof, 402*t*, holes 403*h* (or special strips with holes, said strips are attached to the squeezable bag such that the holes in the strip are located near the top end of the squeezable bag), adapted for insertion of the pegs, respectively, through the holes 403*h* for suspending the bag 402 on the pegs 899, thus facilitating introduction of water and baby feeding formula powder into the bag through its open top 451.

The electrical device 850 comprises surrounding walls 898 (e.g. such as walls 498*a*-498*d* of the embodiment of FIG. 5), which create a space 896 within which the dual structure 400 may be suspended. The walls 898 may (yet not necessarily do) end with a base wall (like base wall 497 of FIG. 5) for closing the space 896 from bottom. Near two opposite wall portions of the surrounding wall 898 (various number of walls may be implemented for producing the surrounding wall, as a matter of design and without departing from the scope of the disclosed subject matter, e.g. one wall in circular or oval contour, six walls in hexagonal contour, and the like), two threaded transmission 819 are located respectively, coupled to a squeezing mechanism for squeezing the squeezable bag 402, for transferring its content into the inflatable baby feeding device 311 The squeezing mechanism in the illustrated embodiment comprises a pair of straps 862 and 863 which function for closing the bag 402 and for winding it (in substitution to the similar functioning of the tongs-like rods mechanism of the embodiment of FIG. 5, or the functioning of the clamping rods of the embodiment of FIG. 5A). The straps 862 and 863 comprise holes 863h on opposite ends 863e thereof, whereby they are mounted together, with their ends 863e secured to mirroring rotatable elements 812 by through pins 816. Rotation of the rotatable elements 812 will occur during up and down motions of the rotatable elements, whenever the cogwheels 812 are geared to the teethed portion of teethed rods 832 and the transmission rods 819 rotate and shift the truncated cylindrical parts 817 down (in which case the straps will rotate in a first direction about their common axis of rotation 877) or up (in which case the straps will rotate in a second direction about their common axis of rotation 877, opposite said first rotation direction). The up and down motions and the rotation may further utilize means similar to the means utilized in the embodiment of FIG. 5, e.g. a T-shaped groove and track. The coupling mechanism is configured to maintain both rotatable elements 812 at similar heights from a bottom of the device during their up and down motions. For example, both rotatable elements may be coupled to a common electrical motor by similar or identical coupling mechanisms, whereby the motor affects the motions of both rotatable elements 812 along the teethed rods, simultaneously and the same, in a mirroring fashion. The mechanism is further configured to maintain simultaneous rotation of both rotatable elements about a common axis of rotation 877, in mirroring (cooperative) rotation directions.

The coupling between the rotatable elements 812 and the cogwheels 814, differs, however, from the coupling of the rotatable body 412 of FIG. 5 to the teethed rod, in that the rotatable element 812 is movable also laterally towards its mirroring counterpart, to a predetermined extent, when the rotatable elements are at or near their uppermost position with respect to the tracks. A mechanism is provided for the lateral movability of each of the rotatable elements 812, and is configured such that lateral motion occurs simultaneously per both rotatable elements 812, in opposite directions along the common axis of rotation 877. In various embodiments of the disclosed subject matter, the mechanism for lateral movability may include strings that pull the rotatable elements laterally upon winding of the strings on a revolving shaft, e.g. the shaft of a common electrical motor. The mechanism for lateral movability may be coupled to the same electrical motor which provides the rotatable elements with their vertical and rotational motions. Since the lateral motion of both is in opposite directions (due to the mirroring configuration), both rotatable elements may come closer or remoter from one another, when the lateral motion takes place. In various embodiments of the disclosed subject matter the lateral movability of each of the rotatable elements 812 is against a biasing force. In various embodiments the biasing force may be generated by a compressible spring/s, magnetic attraction or repulsion and the like. In the illustrated embodiment, the straps 862 and 863 are elastic and tend to maintain linearity. Accordingly, when the opposite ends 863e of the straps 862 and 863 are forced closer, they temporarily deform and take each a curved contour, as exemplified by FIG. 5G. The curved contour allows a bag 402 to be suspended between the straps with its upper end widely open. A biasing force BF resulting from the deformation of the straps, is acting bilaterally as indicated by the arrow annotated BF, tending to return the straps to linearity.

Returning the straps 862 and 863 to linearity will close the bag 402 in between them, making its open end clamped between the straps.

In the illustrated embodiment, lateral motion of the rotatable elements 812 one towards the other, is achieved by a pair of curved tracks 832c which extend diagonally from the teethed rods 832. In the illustrated embodiment, the rotatable elements 812 are telescoping coupled to the cogwheels 814, by means of a stem 813 protruding from the back end 812r of each of the rotatable elements 812, respectively, into a recess 815r which extends laterally into extension 815 of the respective cogwheel 814. The track 832c is configured to guide the backend 812r of the rotatable element 812, away from the cogwheel, when the truncated cylindrical part 817 moves (upon rotation of the threaded transmission rod 819) upwardly in the region from above the top end of the teethed region of the teethed rod 832. In this region the cogwheels do not rotate (due to being disengaged from the teeth of the teethed rods, and the rear end 812r of each of the rotatable element is pushed by the curved track 832c away from the cogwheel and against the biasing force BF, pushing the ends 863e of straps 862 and 863 towards the center of the space 896, whereby the straps finally take their curved position as in FIG. 5G, when reaching their uppermost location from above the bottom of the device. FIG. 5F illustrates the position of the rotatable element 812 with respect to the curved track 832c and to the cogwheel 814, when the rotatable element 812 is in the uppermost position. In this position, the rotatable element 812 is laterally away from the cogwheel 814, in comparison to its position in FIG. 5H, and the stem 813 is partly withdrawn from the recess 815r. The stem 813 and the recess 815r are configured to lack rotational symmetry about the axis 877 (e.g. they may have rectangular cross section transversely to the axis of rotation 877. Consequently, rotation of the cogwheel when geared to the teeth of the teethed rod 819, is transmitted to the rotatable element 812.

The teethed region and the telescoping arrangement 813 and 815r are mutually configured such that the straps 862 and 863 are upright and the pins 816 are horizontally oriented, whenever the cogwheels 814 are ungeared with the teethed rods 832 during vertical motion of the cylindrical bodies. FIG. 5H illustrates the device immediately after clamping the bag 402 by the straps 862 and 863, which is immediately before the cogwheels 814 begin to rotate upon engaging with the teethed region of the teethed rods during downward motion of the truncated cylindrical element 814. Rotation of the cogwheels will result with the bag 402 being teared from the pegs 899, winding around the straps 862 863, thus becoming squeezed to deflate and transfer the liquid content 402f into the inflatable baby feeding device 311.

FIG. 5I illustrates the upper portion of an electrical deflating device 550 for transferring a liquid from a supply container 401 (annotations mentioned in the description of this Fig. that are not included in the drawing relate to items annotated by theses annotations in FIG. 5 or in other Figs, and can be included in the embodiment and be treated by a user in a similar manner as in the embodiments in which they appear and described), into a baby feeding device 311, according to yet another preferred embodiment of the second broad aspect of the disclosed subject matter. The device 550 differs from the device 850, generally in that the axis of rotation 577 of the straps 862 and 863 is immovable in the vertical direction, in the device 550. Accordingly, the device 550 does not include the mechanisms involved with vertical motion of the straps 862 and 863, such as transmission rods 819, toothed bars 832, diagonal portions thereof 832c, cogwheels 814, and the truncated cylindrical part 817.

In substitution of these, rotation of the rotatable elements 812, and hence of the straps 862 and 863, may be driven e.g. by an electrical motor 522. Horizontal motion of the rotatable elements 812 at the opposite ends of the straps towards, and away, from one another, may be achieved either manually by a user, e.g. through a manual lever (not illustrated), or electrically, e.g. by a helical coupling 512h and 514 arranged between a shaft of rotation 522s of the motor and a common end of the straps (connected to rotatable element 812), provided at least on one common end of the straps. The helical coupling tube 512 allows for rotation of the motor's shaft of rotation 522s for a predetermined number of revolves (according to the number of helices 512h), without rotating the rotatable element 812 and hence without rotating the straps.

At the beginning of a deflating session, the rotation of the shafts 522s causes the helical transmission tubes 512 to pull the rotatable elements 812 (and hence the opposite common ends of the straps 862 and 863) apart, thereby bringing the straps together, straightening them and closing the upper end of the squeezable bag 402. Rotation of the straps is enabled upon further rotation of the shafts 522s, after the straps become already straight, whereby the bag 402 is closed. The rotation of the straps occurs when rotation of the helical transmission tubes 512 with respect to the helical pullers 513 is terminated once the straps 862 and 863 are straight, thus do not allow a further increase in the separation between the rotatable elements 812.

At this stage of operation, the bag begins to be rolled around the rotating straps, whereby its internal volume 402f gradually decreases. Another consequence of the rolling of the bag 402 upon rotation of the straps, is that the baby feeding device 311 is gradually elevated. This is because the device 550 lacks a stopper such as stopper 410.

A restriction element 503 is provided next to and below the straps 862 and 863, for disabling the baby feeding device 311 itself (as well as the liquid filled portions 402f of the squeezable bag) from reaching at the rotating straps, thereby avoiding undesired rolling of these around the straps. The restriction element 503 may be mounted on a spring biased axis 504, that keeps the restriction element extending at the same horizontal plane substantially parallel to the axis 577, yet allows it to pivot between first and second extreme positions.

In initial state, starting before suspending the dual structure on the pegs 899, the straps 862 and 863 are arched (as shown in FIG. 5G), the rotatable elements 812 are the closest to one another, and the restriction element 503 is maintained by the spring-biased axis 504 with the end 503e of the restriction element 503 away from the plane of the drawing, such that an imaginary vertical plane at which the ends 503e and 503h of the restriction element are commonly situated, forms an angle of at least 45 degrees with a vertical plane at which the axis of rotation 577 is situated, constituting said first extreme position of the restriction element, and facilitating positioning of a dual structure through the opening formed between the arched straps 862 and 863.

Once the preparation of a liquid formula 402f is finalized within the squeezable bag 402, transferring of the prepared formula into the baby feeding container may start, by activating the motors 522. Rotation of motor shafts 522s cause rotation of the transmission tubes 512, which pull the rotatable members 812 away from one another by the helical coupling 512h and 514, thereby straightening the straps 862 and 863, and closing the squeezable bag 402. One of the rotatable elements 812 may be provided with a disc like flange 512f, such that upon lateral motion of the respective rotatable element, the flange 512f pushes against the lever 503h of the restriction element 503 thus pivoting the restriction element until reaching its second extreme position, with the vertical plane in which the restriction element is situated is parallel or nearly parallel to the axis of rotation 577.

Leaf spring 502 may be connected at a first end thereof to a wall (e.g. surrounding wall 898) of the device, such that a second end thereof is in friction with a rotatable element 812, for eliminating rotation of the straps due to the friction between the helical transmission tubes 512 and the pullers 513 when the helical transmission 512h and 514 perform said predetermined number of revolves.

Back rotation of the straps after completion of the liquid transferring process, for freeing the used squeezable bag 402 from the straps 862 and 863 and for returning the straps to their initial position, prepared for a new session of liquid transferring, can be performed by activating the motors 522 in reverse direction. In some embodiments of the disclosed subject matter, rotation of the motors 522 (and consequently of the transmission tubes 512) can be performed in the first direction against a biasing force, such as against the force of a spiral spring (not shown in the Fig.) connected at first end thereof to a stationary point of the device and at a second end thereof to a point rotating with the motor's shaft 522s, whereby back rotation of the straps 562 and 563 to their initial position is automated by force of the spring once electrical power to the motors 522 is turned off upon completion of the liquid transferring process.

Figure 5J:
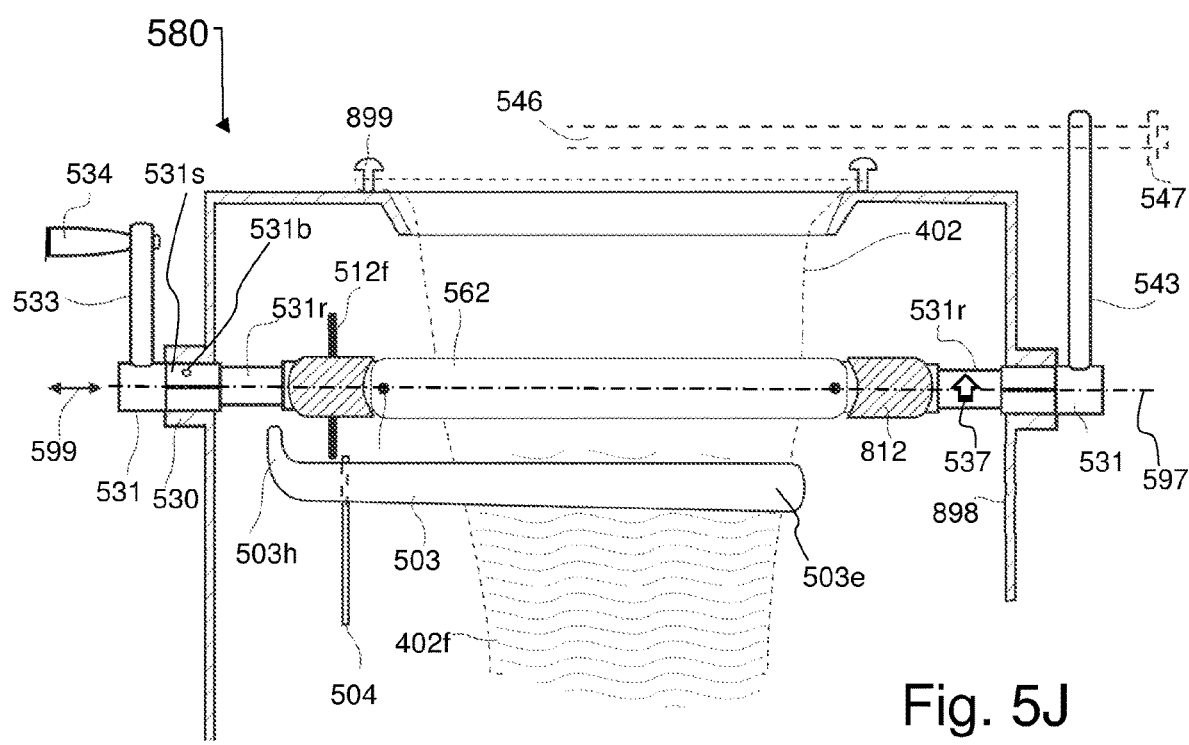
FIG. 5J illustrates an electrical deflating device for transferring a liquid from a supply container into a baby feeding device, according to an eighth embodiment of the disclosed subject matter.

FIG. 5J illustrates the upper portion of an electrical deflating device 580 for transferring a liquid from a supply container 401 (annotations mentioned in the description of this Fig. that are not included in the drawing relate to items annotated by theses annotations in FIG. 5 or in other Figs, and can be included in the embodiment and be treated by a user in a similar manner as in the embodiments in which they appear and described), into a baby feeding device 311, according to yet another preferred embodiment of the second broad aspect of the disclosed subject matter.

The device 580 differs from the device 550, generally in that the straps 862 and 863 in the device 580 are configured especially for manual operation, by a user, both in their rotational function and in the lateral motions of their ends (while the device 550 adopts a configuration which may be considered more suitable to operate by electrical motor). Rotation of the rotatable elements 812, and hence of the straps 862 and 863, may be driven by user's hand e.g. through rotatable handle 534, or e.g. by ratchet handle 546, by which the user may control the shaft levers 533 and 543, respectively. Each of said handles represent a different variation of the device 580. In a first variation of the device 580, the ratchet handle 546 does not exist, and handles 534 are present on both opposite lateral ends of the device in mirroring configuration. In a second variation of the device, the ratchet handle 546 and its shaft lever 533 do not exist, and shaft levers 543 are present on both opposite lateral ends of the device in mirroring configuration, with ratchet handle 546 bridging between them thereby allowing simultaneous cooperative operation of the shaft's levers on both lateral ends of the device. A ratchet mechanism 537 having a direction selector, intermediates internally to the shaft portions, between shaft's end portion 531 and shaft's portion 531r, in a manner that allows user to select the direction of rotation enabled by the ratchet per every stage of operation of the device. Ratchet handle 546 passes freely through the lever 543, via an appropriate aperture located near the free end of the lever, thus allowing a user to pull the shafts 531 laterally, away from one another. Discs 547 guarantee the ratchet lever 546 from slipping out of the levers 543.

Horizontal motion of the rotatable elements 812 at the opposite ends of the straps towards, and away, from one another, may be achieved by pushing together or pulling away the shafts 531 on both sides of the device, through tubular openings 530 located on opposite ends of the surrounding wall 898 of the device. The lateral motion of both shafts is in anyone of the directions indicated by bidirectional arrow 599, depending on the stage of operation of the device. In the illustrated position the shafts 531 are the closest, hence the straps are in their arched state as illustrated by FIG. 5G.

The tubular openings 530 are of noncircular cross section in a vertical plane perpendicular to the surface of the drawing, e.g. a square cross section, in match with a cross section of the respective shaft, at the shaft's region 531s. A spring-loaded ball bearing 531b may be provided for keeping the shaft 531 in the illustrated position, when filling a squeezable bag 402 and preparing the baby feeding formula. The straps 862 and 863 cannot be rotated in the illustrated position of the shafts and the opening created between them due to their arching is horizontally aligned (for receiving the dual structure through the top opening of the device), due to the mutual matching between the cross section design of the tubular openings 530 and the cross section of the shaft 531 at shaft's region 531s.

Outwardly facing end of each of the shafts 531 may be of circular cross section greater in diameter than that of the tubular opening interiors, the shafts thus being stopped from coming closer than illustrated.

Each of the shafts 531 further comprises a region 531r located on the shaft from the internal end of the respective tubular opening 530. The shaft's region 531r is of circular cross section perpendicularly to the plane of the drawing, and is of a diameter in match with the dimensions of the cross section of the opening 530 so as to allow rotation of the shaft 531 about the axis 597, at the stage of operation when the shaft's region 531r takes place inside the tubular opening 530. This stage of operation occurs after completion of preparation of the baby feeding formula inside the squeezable bag, once the user has pulled the shafts 531 outwardly on both lateral ends of the device 580.

Linear motions of the rotatable elements 812 manipulate the position of restriction member 503 by making it pivot about axis 504 according to the lateral location of the disk like flange 512f along axis 597, as described above for device 550, and by interacting with lever end 503h of the restriction member 503.

Figure 5K:
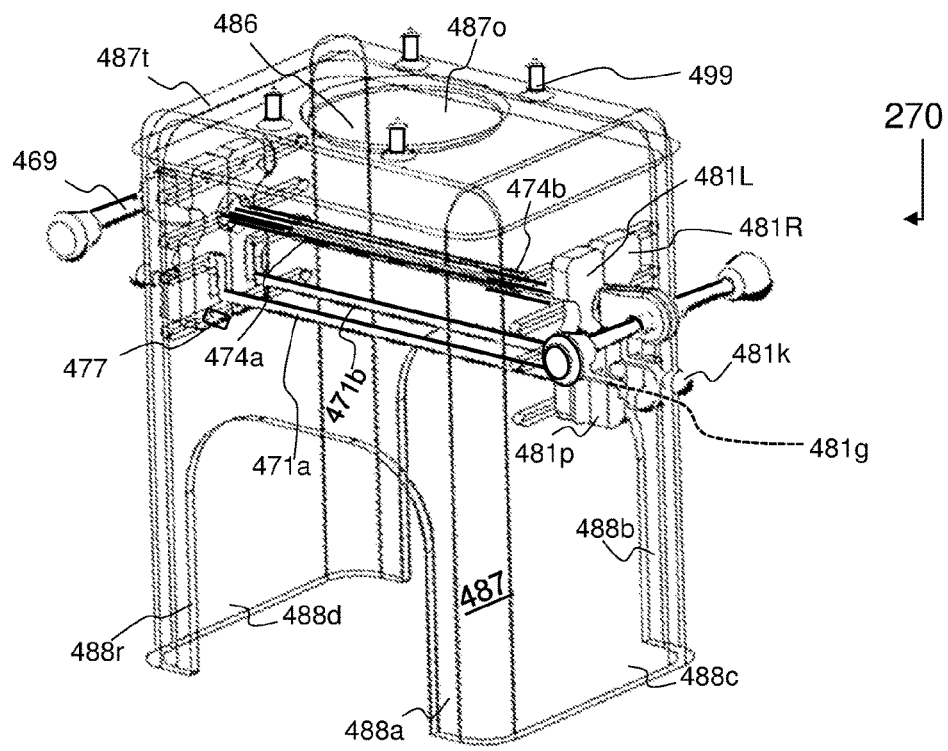
FIG. 5K illustrates a perspective view of manually operated deflating device for transferring a liquid from a supply container into a baby feeding device, according to a ninth embodiment of the disclosed subject matter.
Figure 5L:
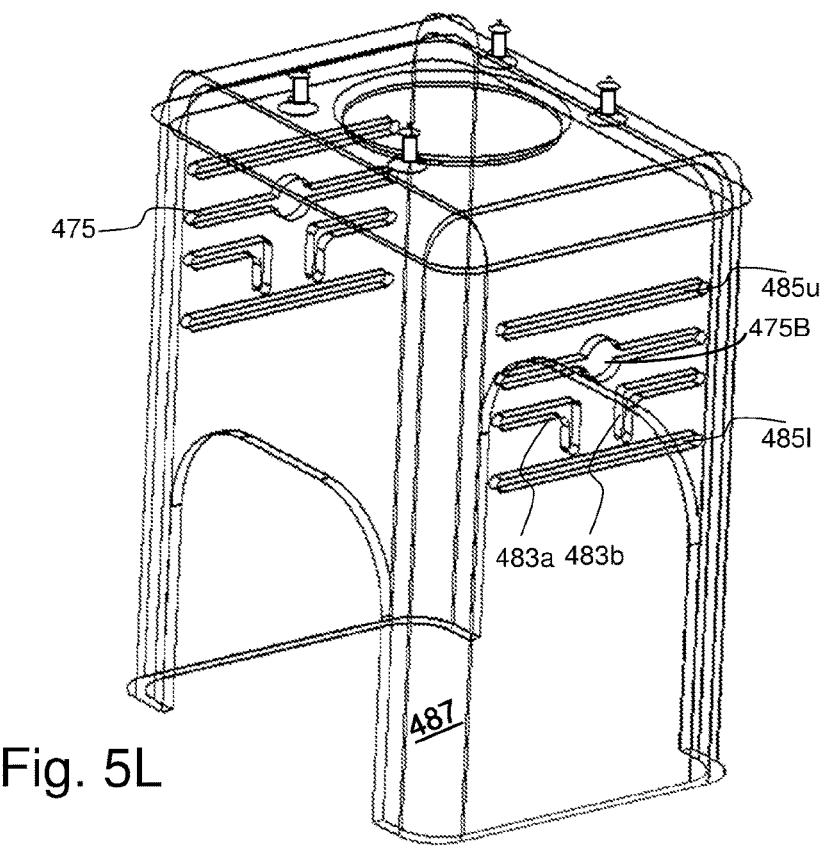
FIG. 5L illustrates a perspective view of a body of the deflating device illustrated by FIG. 5K, with the moving parts of the device removed to provide for an unobstructed view of the body structure.

FIGS. 5K-5L illustrate views of a manually operated deflating device 270 for transferring a liquid from a supply container 401 into a baby feeding device 311, according to another preferred embodiment of the second broad aspect of the disclosed subject matter. It is to be noticed that the illustrated embodiment is illustrated as having its body made of a transparent material (similar to the embodiments shown in FIGS. 5 and 5A), thus back facing portions of the body and of some movable members supported by, are visible through front facing walls of the body.

A dual structure 400 comprising a squeezable bag 402 and an inflatable baby feeding container 312 can be suspended on the pegs 499, similarly to the suspension of the dual structure 400 on the device shown by FIG. 5. The squeezable bag 402 comprises at a top end thereof, 401t, holes (or special strips having loops or holes at a free end of the strip), adapted for insertion of the pegs, respectively, for suspending the bag 402 on the pegs 499, thus facilitating introduction of water and baby feeding formula powder into the bag through its open top 451.

The manually operated device 270 comprises a body 487 having surrounding walls 488a-488d which create a space 486 in between, for the dual structure 400 to be suspended. The space 486 is accessible either through an opening 487o formed in the top wall 487t of the body 487, or through access recesses 488r created in one or two of the surrounding walls 488a and 488b. The surrounding walls may (yet in the illustrated embodiment do not) end at their lower end with a base wall for closing the space 486 from bottom. Two opposite walls 488c and 488d from the four, comprise five grooves each. Two of the five grooves on each of said opposite walls, the upper and the lower grooves 485u and 485l, serve as tracks which support and allow for lateral movability of a pair of mutually interlocking plates 481L and 481R. The mutually interlocking plates 481L and 481R function for locking together (similarly to the function of 490r) the clamping rods 474a and 474h, while allowing a user to rotate them together, by turning the leverage rods 469, similarly to rotating the leverage rods 459 of the embodiment of FIG. 5A.

The mutually interlocking plates 481L and 481R are laterally slidable along the grooves 485u and 485l to which they are slidably coupled through engaging protrusions, e.g. protrusions 477 formed at the corner regions of each of the interlocking plates.

The clamping rods 474a and 474b, are laterally movable through a third of the five grooves created on each of said opposite walls. The third groove 475, (located next below said upper groove 485u), is a through grove for the clamping rods 474a and 474b, configured to allow for their lateral motion, and has a circular broadening 475B in its middle region, configured to allow for their smooth rotation once brought to the center of the groove and mutually interlocked (with the upper portion of the squeezable bag 402 clamped in between them) by the mutually interlocking plates 481L and 481R.

Each of the mutually interlocking plates 481L and 481R comprise a semi-circular indentation configured to accept a respective one of the clamping rods 474a and 474b, such that when interlocked together, the mirroring semi-circular indentations form together a circular opening corresponding to the circular broadening 475B, which allows for smooth rotation of the interlocked clamping rods 474a and 474b through the mutually interlocking plates 481L and 481R.

The illustrated device 270, mainly differs from the device 250 of FIG. 5A, by comprising a pair of restriction rods 471a and 471b, intended to disable the inflated portion of the squeezable bag 402, from elevating and reaching the clamping rods 474a and 474b when rotated for inflating the inflatable container of the dual structure 400.

The restriction rods 471a and 471b (referred to in this specification also as restriction elements) are movable, respectively, through the fourth (483a) and fifth (483b) of the five grooves created on each of said opposite walls. The grooves for the restriction grooves, i.e. through grooves 483a and 483h, has each an L-like contour having a horizontal groove segment configured to allow for lateral motion of the respective restriction rod, and a vertical groove segment configured to allow the respective restriction rod to move vertically, once brought by its lateral motion to a region closest to the axis of rotation of the clamping rods 474a and 474b. The vertical segment of each of the L-like grooves extends downwardly from a respective end of the respective horizontal segment of the groove, such that once a restriction rod is brought to the end of the lateral segment of the L-like groove closest to axis of rotation of the clamping rods, the restriction rod can move (and in preferred embodiments can freely fall at least for the first few millimeters) down the vertical segment of the L-like groove. The restriction rods are captured to the mutually interlocking plates 481L and 481R, within respective vertical grooves 481g, such that lateral motion of the restriction rods correspond to simultaneous lateral motion of a respective one of the mutually interlocking plates 481L and 481R. Likewise, each of the clamping rods 474a and 474b may be captured to the respective semicircular indentation in the mutually interlocking plates 481L and 481R, through a semicircular wheel member (not shown), such that the clamping rod lateral motion also correspond and is simultaneous with the lateral motion of the mutually interlocking plates 481L and 481R. Once brought together by lateral motion, the semicircular wheel members of each of the mutually interlocking plates 481L and 481R, are snapped together by mutual releasable connective means to form a rotatable wheel configured to rotate within the circular opening formed by the semicircular indentations, and to thereby allow rotation of the clamping rods 474a and 474b, by using the leveraging rods, for rolling the squeezable bag around the rods similarly to its rolling in the embodiment of FIG. 5A.

In various preferred embodiments, the vertical grooves 481g extend through flexible vertical protrusions 481p, outwardly protruding from the mutually interlocking plates 481L and 481R, respectively, and snugly fitting with the restriction rods, such that once a restriction rod is manually forced (using knobs 481k at its ends) to the bottom end of the respective vertical groove, it will remain immovable during the inflating operation mode of the inflating device, for thereby preventing elevation of the inflating portion of the squeezable bag beyond the restriction rods.

Once a dual-structure 400 is suspended from the vertical pegs 499, and after filling and finalizing the formula, bringing the clamping-rods 474a and 474b together, will make the top end of the squeezable supply bag 402 clamped between the clamping-rods at the area along their common rotation axis 490a. In various embodiments of the disclosed subject matter the clamping rods may have each a star like cross section design transversely to its longitudinal axis. The clamping-rods 474a and 474b can then be rotated by a user, thereby rolling the squeezable bag 402 and reducing its volume. The remaining parts of operation of the device can be appreciated reading the operation description relating to the device 250.

FIGS. 6A-6C illustrate a liquid receiving port 600 of a baby feeding device 311 with its inflatable container 312 shown before being inflated (only portion 312 of the baby feeding device is illustrated here, in FIG. 6C, for full view see FIG. 3). The inflatable container 312 constitutes the inflatable part of the dual structure according to various embodiments of the presently disclosed subject matter. The liquid receiving port 600 comprises a cylindrical wall 601C, a plug 601 having a circumferential rim 601e to be inserted into a bottom end of a flexible inflatable sleeve 312 constituting an inflatable container. In FIG. 6C the plug is seen in position (in upside-down orientation to that shown in FIG. 6A, corresponding to its orientation in the filling apparatus shown by FIG. 3), inside the sleeve 312, with a pressure ring 315r pressing an end portion of the sleeve 312 into a ring recess 601r formed in the cylindrical wall 601c. The sleeve is thus secured to the liquid receiving port 600, irremovably in response to unintentional forces that may be exerted by a user during use of the device. A semi rigid protector 315 having a circular opening in match with the outer circumference of the pressure ring 315r, is snapped to the pressure ring by insertion of the protector's edge which faces the circular opening, into a matching circumferential groove in the pressure ring. The liquid receiving port 600 comprises a unidirectional valve allowing entrance of liquid under pressure from the squeezable bag 302 into the inflatable sleeve 312, while preventing backflow from the sleeve 312 out of the port 600. The unidirectional valve comprises at least one aperture 602 formed in the cylindrical wall 601c a few millimeters (e.g. between 3-12 mm) away from the rim 601e. A flexible ring band 603 is mounted on the cylindrical wall 601c under the end rim 601c. The band 603 is dimensioned to snugly fit onto the cylindrical wall 601c for normally sealing the apertures 602 from liquid passage, due to the pressure between the ring band 603 and the cylindrical wall 601c where the apertures 602 are formed.

A liquid pressure inside the inflatable sleeve 312 will increase the pressing of the ring band 603 on the cylindrical wall 601c thereby empowering the sealing of apertures 602 and preventing escape of liquid from the inflatable container through the liquid receiving port 600. In contrast to this, when a liquid of a pressure greater than the pressure inside the inflatable sleeve 312 is forced into the liquid receiving port 600 through a hollow neck 601h thereof, the pressurized liquid will press the ring band 603 through the apertures 602 away from the cylindrical wall 601c, thereby allowing the pressurized liquid to enter the inflatable sleeve 312 through a temporal gap created, under said liquid pressure, between the ring band 603 and the cylindrical wall 601c. Thus, as long as the filling apparatus is squeezing the flexible bag 302 in a deflating pressure with an amount of liquid contained in the bag, liquid will flow from the bag 302 into the inflatable container 312. Once the inflow stops (due to removal of the squeezing pressure from the bag 302, or as may occur e.g. when all its contained liquid has been transferred into the inflatable container 312), backflow from the inflatable container 312 is prevented by the ring band 603 resealing the apertures 602 under the pressure of liquid inside the inflatable container. The liquid receiving port 600 may comprise a flange part 601f for facilitating connection with a connective member 305 constituting an outlet port of flexible bag 302. The flange part 601f may comprise a treading matching a mutual threading formed in the connective member 305. In various embodiments the connection between the connective member 305 and the liquid receiving port 600 is by friction fitting, with or without mutually engaging partial-rotation parts (i.e. parts that engage and become secured together upon respective partial rotation).

FIG. 7A illustrates in an exploded vertical cross section view three members of another embodiment of a liquid receiving port 700a of a baby feeding device constituting the inflatable container part of the dual structure according to various embodiments of the presently disclosed subject matter. The three members are a flexible valve membrane 710, a tubular membrane-retaining member 701i, and a port body 720. When mounted together, the valve membrane 710 is deployed on a flat base surface 710b which is an outer surface of base wall 720b (annotated in FIG. 7D), facing toward the inflatable container 311 (not shown here). In various embodiments of the presently disclosed subject matter the membrane is formed from silicone rubber and is secured to the base surface by the bottom edge of the tubular wall 701 of the tubular membrane-retaining member 701i. A plurality of, e.g. four, pointed protrusions 701p protrude downwardly beyond the bottom end of tubular wall 701. The pointed protrusions squeeze into the membrane 710 in respective, e.g. four points near its ends, for better grasp on the membrane between the base surface 710b, and the retaining member 701i. A liquid inlet aperture 720a is formed through the base wall 720b and is sealed from the inflatable-container's direction by said valve membrane 710.

A pair of semicircular recesses 701r are formed at the bottom end of the tubular wall 701 of the retaining-member 701i, thereby allowing the valve membrane 710 to separate from the valve's base surface 710b at the recessed regions. The recesses are formed on opposite ends of a common diameter line (i.e. are spaced from one another 180 degrees on the circumference of the tubular wall 710). The tubular member 701i has a predetermined mounting position on the port body 720, resulting from the mutual protrusion and aperture snap connections 701s-720s by which the tubular member 701i is secured to the port body 720. When in position, the semicircular recesses 701r are aligned with openings 720o formed through the cylindrical wall 720c, immediately above the base surface 710b. The openings 720o allow for liquid communication between the inflatable container 312 (see FIG. 6C) and the insides of the tubular member 701i, through the semicircular recesses 701r. The inflatable container 312 may be immovably attached to the cylindrical wall 720c of the port body 720, in a similar manner to the attachment between the inflatable container 312 and the cylindrical wall 601c in the embodiment illustrated by FIGS. 6A-6C. Ring recess 720r (analogous to ring recess 601r) allows for the connection by a matching press-ring (analogous to press ring 315r), and is further comprising bulges 721 for slip-proof attachment. Thus, when the pressure inside the inflatable container is greater than a pressure in the hollow space 720h of the liquid receiving port, the pressure will be communicated through openings 720o and the semicircular recesses 701r on top of the valve membrane 710, thereby stressing it to the base surface 710b and sealing the aperture 720a, as exemplified by the membrane position in FIG. 7D.

Contrarily, when the pressure in the hollow space 720h is greater than the liquid pressure inside the inflatable container (e.g. due to the filling apparatus squeezing the flexible bag 302 for delivering its liquid into the inflatable container 312), the pressure will be communicated through the valve aperture 720a to a bottom of the valve membrane 710, thereby deforming the membrane as exemplified in FIG. 7E (in FIGS. 7D and 7E the valve membrane 710 is marked with 'xxxxx' pattern for ease of recognition), such that liquid may escape through between the base surface 710b and the bottom of the membrane 710 at the recessed semicircular regions 701r, into the inflatable container 312 via openings 720o.

Once the pressure in the hollow space 720h becomes smaller than that of the liquid inside the inflatable container, the valve membrane 710 will again become pressed toward the valve base surface 710b, thus avoiding backflow out from the inflatable container.

An advantage of the liquid receiving ports illustrated in FIGS. 7A-7E is that liquid may be withdrawn from the inflatable container by a syringe since the aperture 720a and the valve membrane 710 from above the aperture are approachable and penetrable by a syringe needle. Additionally, since the inflatable container is disposable, withdrawal of liquid from the inflatable container even into a syringe lacking a needle, is possible. The needle-free syringe may be coupled to the port body 720 intentionally, forcing the valve membrane out of position (even by tearing it or causing it an irreparable damage), pushing it with the tip of the syringe inserted into aperture 720a through the hollow 720h of the cylindrical wall 720c.

Flange 720f delimits the ring recess 720r from its bottom and defines a connective region between lateral protrusions 722 and the flange 720f, for connecting a liquid outlet port 722 of a flexible bag 302 having a mutual connective means 305, e.g. by a partial rotation connection method. Alternatively, a friction connection may be provided between the outlet port of the flexible bag and the liquid receiving port 700a of the inflatable container 311. In various other embodiments a mutual threading is provided between the related ports for making the connection. As a matter of design the threading may be either internal on the cylindrical wall 720c inner face (facing the hollow 720h), or on the outer face of the cylindrical wall 720c (e.g. in embodiments in which the lateral protrusions 722 does not exist).

What is claimed is:

1. A deflating device for transferring a liquid content from a supply container into a baby feeding device, wherein the deflating device comprises a positioning and holding arrangement configured for positioning and for holding a dual structure comprising (i) a squeezable bag prefilled with a liquid content and constituting said supply container, and (ii) an inflatable container constituting said baby feeding device, the positioning and holding arrangement being configured to allow transferring the liquid content from the squeezable bag into the inflatable container while holding the dual structure; the deflating device is further comprising a deflating mechanism configured to apply a deflating pressure on the squeezable bag thereby evacuating its liquid content into the inflatable container; wherein the positioning and holding arrangement comprises a suspension arrangement for holding the dual structure in vertical orientation with the squeezable bag located up from inflatable container and having its top open in a filling position in the deflating device and accessible through an opening in a body of the deflating device, whereby facilitating introduction of ingredients of a baby feeding formula into the supply container, before applying a squeezing session on the prepared formula, the deflating device is further comprising a squeezer configured to clamp a top end of the squeezable bag at an area along a common rotation axis for closing the squeezable bag above the level of its liquid content and winding the squeezable bag about the squeezer, from a distal end of the squeezable bag to a proximal end of the squeezable bag closer to the inflatable container part upon rotation of the squeezer about the common rotation axis.

2. The deflating device according to claim 1, wherein the suspension arrangement comprises a plurality of spaced apart upwardly extending pegs.

3. The deflating device according to claim 1, wherein the deflating mechanism comprises an electrical motor for causing a respective movement between at least a portion of the dual structure and the squeezer.

4. The deflating device according to claim 1, wherein the squeezer comprises a pair of rods in tongs-like configuration.

5. The deflating device according to claim 4, wherein the pair of rods are pivotably connected each near a proximal end thereof to a common vertically movable member.

6. The deflating device according to claim 4, wherein the pair of rods are pivotably connected each near a proximal end thereof to a common rotatable member.

7. The deflating device according to claim 6, wherein the common rotatable member is configured to move vertically while rotating.

8. The deflating device according to claim 1, wherein the squeezer comprises two straps structured together and configured to depart one from another in mirroring arches when longitudinal ends thereof become closer and to come together and become straight when longitudinal ends thereof are in maximal separation.

9. The deflating device according to claim 8, wherein the straps are connected, respectively, near longitudinal ends thereof to respective common vertically movable members.

10. The deflating device according to claim 8, wherein the straps are connected, respectively, near longitudinal ends thereof to respective common rotatable members.

11. The deflating device according to claim 10, wherein the common rotatable members are configured to rotate while moving vertically for a predetermined vertical extent.

12. The deflating device according to claim 10, wherein an axis of rotation of the common rotatable members is immovable with respect to a vertical axis of the device.

13. The deflating device according to claim 12, further comprising at last one restriction element configured for allowing the squeezable bag to be rolled on the straps upon rotation thereof by the rotatable members, while disabling inflated portions of the dual structure from elevating above the restriction element.

14. The deflating device according to claim 1, further comprising a stirring member configured to maneuver the liquid content of the squeezable bag by repeatedly deforming the bag from its outer side.

15. A liquid receiving port for inflatable baby feeding containers to be filled by the deflating device according to claim 1, comprising a clamping arrangement for securing an open end of a stretchable container of the inflatable baby feeding container around a body of the liquid receiving port, at least one aperture in a wall of said body, and a diaphragm disposed in front of the at least one aperture, whereby liquid pressure from inside the stretchable container presses the diaphragm towards the wall, thus sealing the aperture by the diaphragm, whereby liquid pressure from outside the stretchable container presses the diaphragm away from the wall, thus creating a temporal gap between the wall and the diaphragm, through which the liquid from outside can escape into the stretchable container.

16. A deflating device for transferring a liquid content from a supply container into a baby feeding device, wherein the deflating device comprises a positioning and holding arrangement configured for positioning and for holding a dual structure comprising (i) a squeezable bag prefilled with a liquid content and constituting said supply container, and (ii) an inflatable container constituting said baby feeding device, the positioning and holding arrangement being configured to allow transferring the liquid content from the squeezable bag into the inflatable container while the dual structure is held by; the deflating device is further comprising a deflating mechanism configured to apply a deflating pressure on the squeezable bag thereby evacuating its liquid content into the inflatable container; the deflating device comprises a housing and a doored space inside the housing adapted for receiving and holding the dual structure isolated from the exterior environment whereby air pressure differing from the atmospheric air pressure can be maintained at least in a portion of the doored space as a means for a handsfree transferring of liquid content from the squeezable into the inflatable container; wherein the doored space comprises, in a midportion thereof, a clamping arrangement adapted to grip hold the dual structure in a connection region between the squeezable bag and the baby feeding device; and wherein the clamping arrangement comprises a first semicircular element protruding from a back wall of the doored space, and a second semicircular element protruding from a door of the doored space.

17. A deflating device for transferring a liquid content from a supply container into a baby feeding device, wherein the deflating device comprises a positioning and holding arrangement configured for positioning and for holding a dual structure comprising (i) a squeezable bag prefilled with a liquid content and constituting said supply container, and (ii) an inflatable container constituting said baby feeding device, the positioning and holding arrangement being configured to allow transferring the liquid content from the squeezable bag into the inflatable container while the dual structure is held by; the deflating device is further comprising a deflating mechanism configured to apply a deflating pressure on the squeezable bag thereby evacuating its liquid content into the inflatable container, wherein the deflating mechanism comprises an air pump for inflating the inflatable baby feeding device by providing pressure differentiation between a pressure in which the squeezable bag is situated and a pressure in which the baby feeding device is situated, such that the baby feeding device is exposed to a negative external pressure with respect to a pressure in which the squeezable bag is situated, thereby deflating the squeezable bag.

* * * * *